United States Patent
Nomura et al.

(10) Patent No.: US 7,557,822 B2
(45) Date of Patent: Jul. 7, 2009

(54) APPARATUS FOR AND METHOD OF FORMING IMAGE USING OSCILLATION MIRROR

(75) Inventors: Yujiro Nomura, Nagano-ken (JP); Ken Ikuma, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 418 days.

(21) Appl. No.: 11/107,981

(22) Filed: Apr. 14, 2005

(65) Prior Publication Data
US 2005/0231581 A1 Oct. 20, 2005

(30) Foreign Application Priority Data

| Apr. 20, 2004 | (JP) | ............................. 2004-124573 |
| Mar. 9, 2005 | (JP) | ............................. 2005-065493 |
| Mar. 14, 2005 | (JP) | ............................. 2005-070319 |
| Mar. 14, 2005 | (JP) | ............................. 2005-070320 |

(51) Int. Cl.
B41J 15/14 (2006.01)
B41J 27/00 (2006.01)

(52) U.S. Cl. ..................................... 347/243; 347/260

(58) Field of Classification Search ................ 399/236; 347/118, 243, 259–260, 231; 250/201.1; 359/212–215, 223–225.1
See application file for complete search history.

(56) References Cited

U.S. PATENT DOCUMENTS

| 4,044,248 | A | * | 8/1977 | Glassman ................. 250/201.1 |
| 4,686,363 | A | * | 8/1987 | Schoon ........................ 250/235 |
| 4,919,499 | A | * | 4/1990 | Aiba ............................ 359/214 |
| 5,331,341 | A | | 7/1994 | Egawa et al. |
| 6,049,351 | A | | 4/2000 | Noguchi et al. |
| 6,061,163 | A | * | 5/2000 | Melville ...................... 359/214 |
| 6,094,208 | A | * | 7/2000 | Oda et al. .................... 347/118 |
| 6,121,992 | A | | 9/2000 | Girmay |
| 6,844,951 | B2 | * | 1/2005 | Cannon et al. .............. 359/223 |
| 6,970,275 | B2 | * | 11/2005 | Cannon et al. .............. 359/199 |
| 2002/0118981 | A1 | * | 8/2002 | Kojima et al. ............... 399/236 |
| 2002/0122217 | A1 | * | 9/2002 | Nakajima ................... 358/505 |

(Continued)

FOREIGN PATENT DOCUMENTS

EP 0720120 A2 7/1996

(Continued)

OTHER PUBLICATIONS

European Search Report for corresponding European application No. 05008544.8-2217 lists the references above.

*Primary Examiner*—Hai C Pham
(74) *Attorney, Agent, or Firm*—Hogan & Hartson LLP

(57) ABSTRACT

A scan-beam detection signal Hsync provided by horizontal synchronous sensors 60A, 60B is inputted to a drive signal controlling section 10Y as a drive period signal related to a drive period of a deflective mirror. The drive signal controlling section 10Y controls a drive signal Sd such as to establish a predetermined relationship between a phase of a reference signal Sr and a phase of the horizontal synchronous signal Hsync, whereby a deflector 65 is allowed to operate in synchronism with the reference signal Sr. Therefore, a latent-image forming position with respect to a sub-scan direction Y is adjusted by way of the phase adjustment between the reference signal Sr and the horizontal synchronous signal Hsync, so that a linear latent image is prevented from deviating with respect to the sub-scan direction Y.

12 Claims, 14 Drawing Sheets

U.S. PATENT DOCUMENTS

2002/0141001 A1 10/2002 Hirasawa
2003/0072066 A1* 4/2003 Hayashi et al. ............. 359/201
2003/0227538 A1 12/2003 Fujii et al.

FOREIGN PATENT DOCUMENTS

| | | | |
|---|---|---|---|
| JP | 01-302317 | | 12/1989 |
| JP | 01302317 A | * | 12/1989 |
| JP | 07159711 A | * | 6/1995 |
| JP | 09197334 A | | 7/1997 |
| JP | 2004-053943 | | 2/2004 |
| JP | 2004-191416 | | 7/2004 |
| JP | 2005-031238 | | 2/2005 |

* cited by examiner

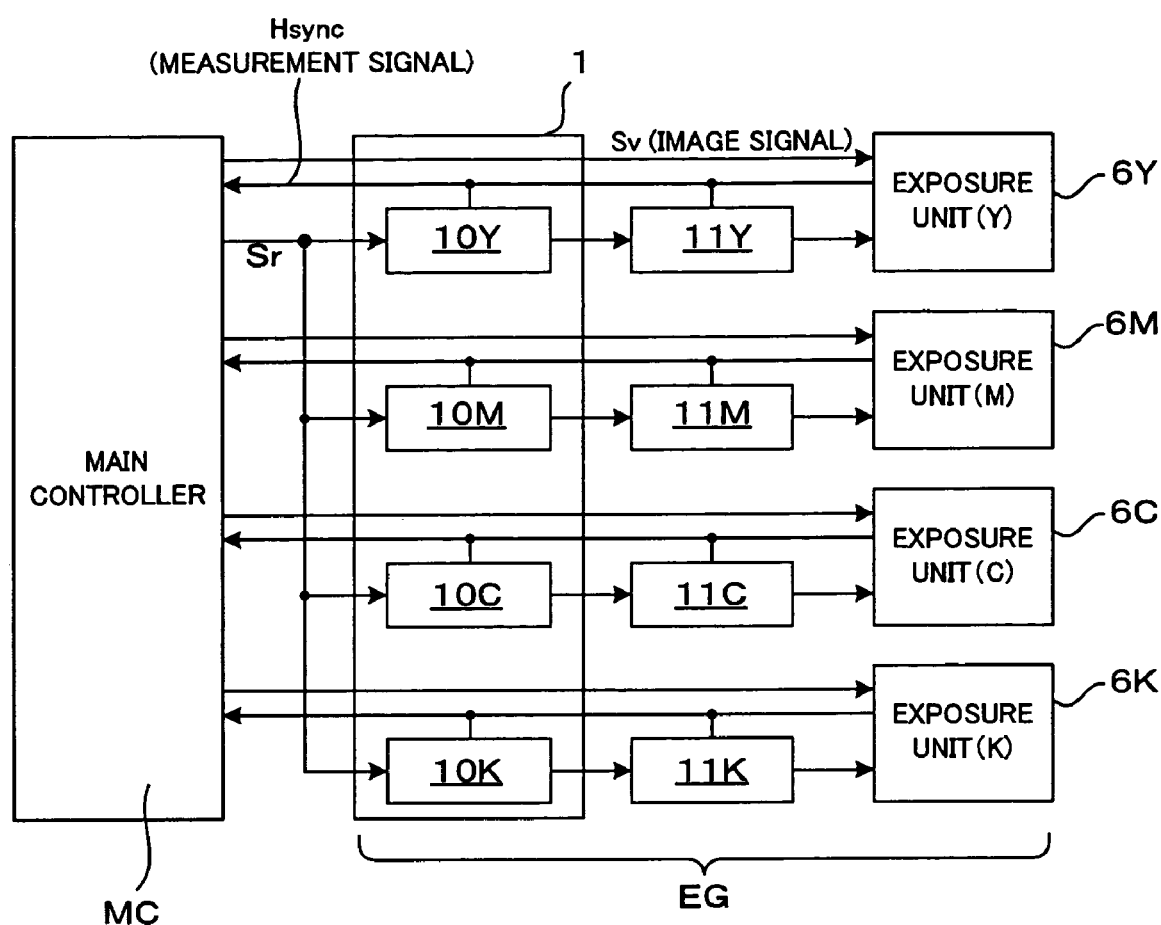
F I G. 2

FIG. 6A: BEFORE ADJUSTMENT OF RESONANT FREQUENCY
FIG. 6B: AFTER ADJUSTMENT OF RESONANT FREQUENCY
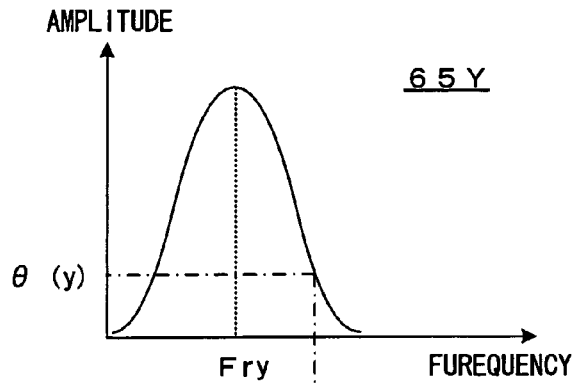
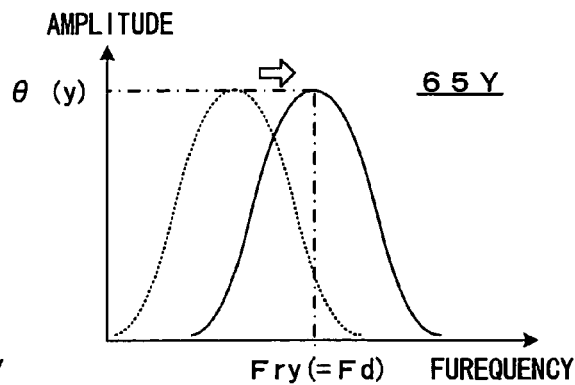
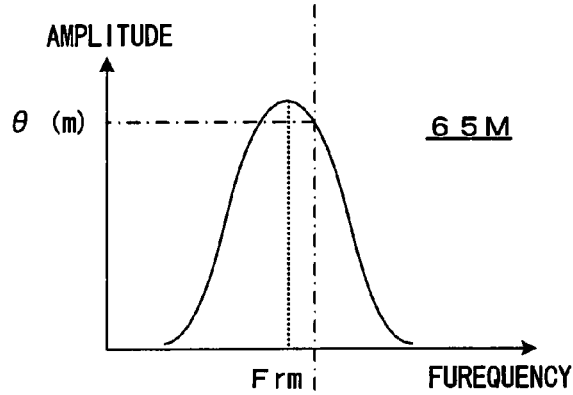
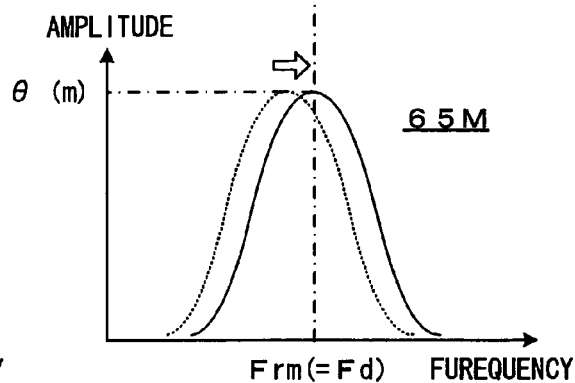
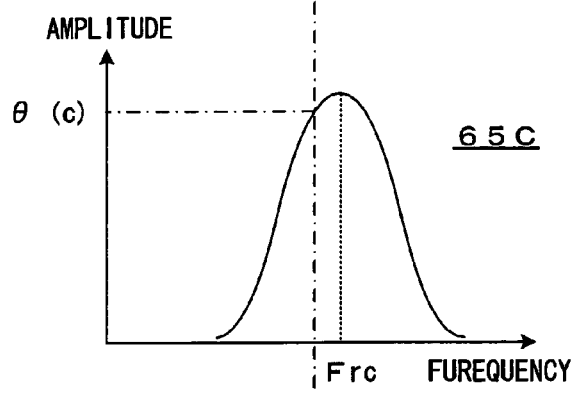
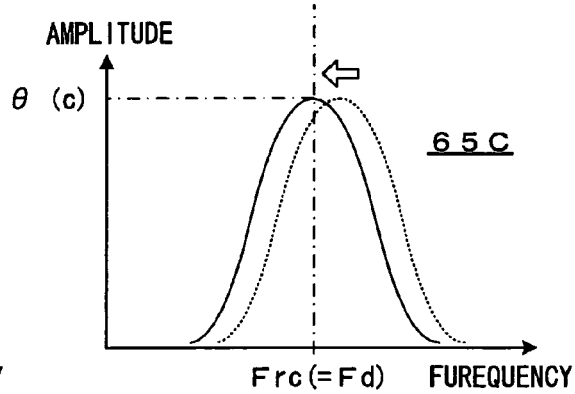
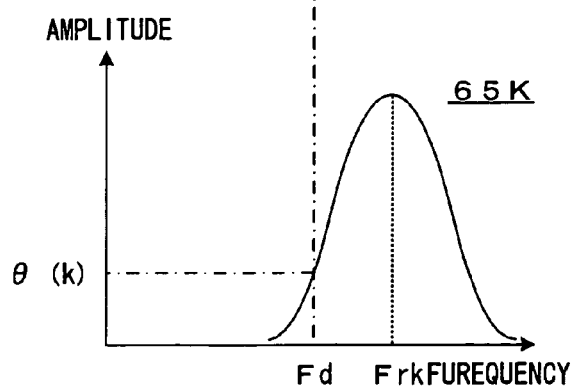
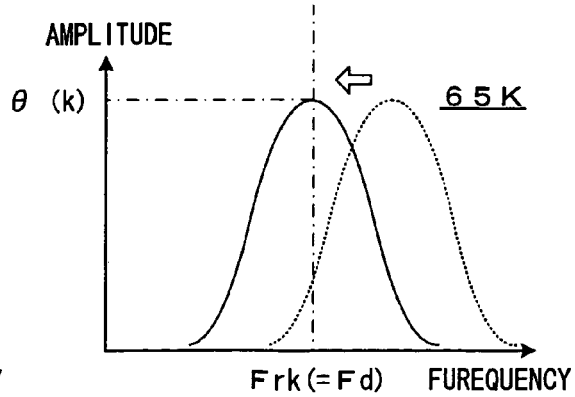

FIG. 9A : BEFORE ADJUSTMENT OF DRIVE VOLTAGE
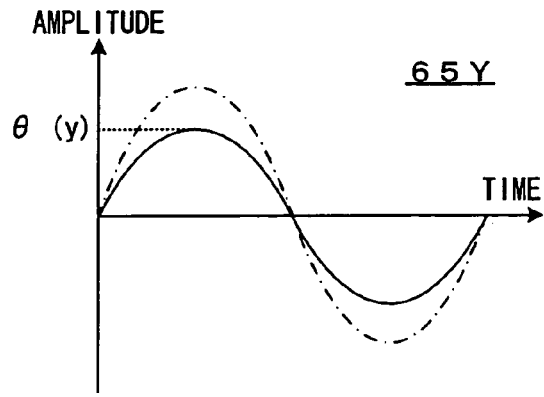
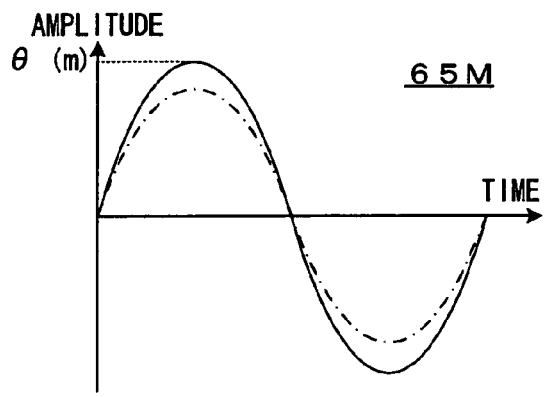
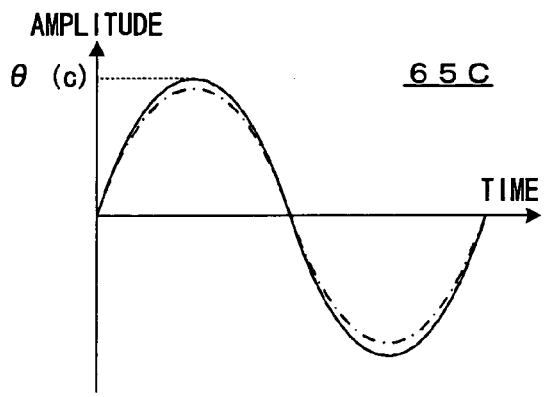
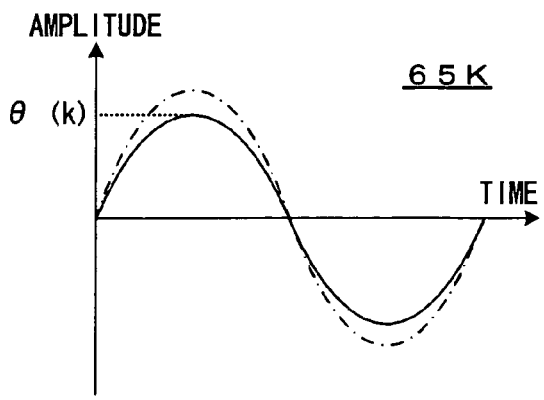
FIG. 9B : AFTER ADJUSTMENT OF DRIVE VOLTAGE
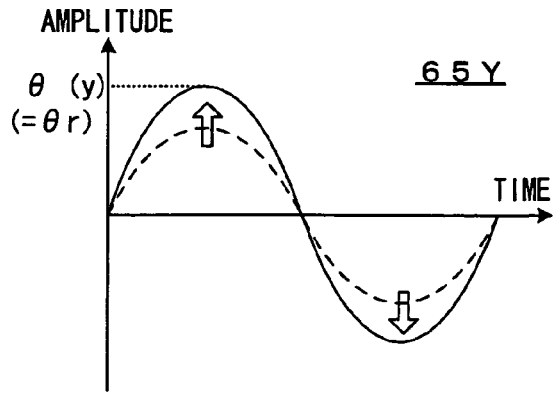
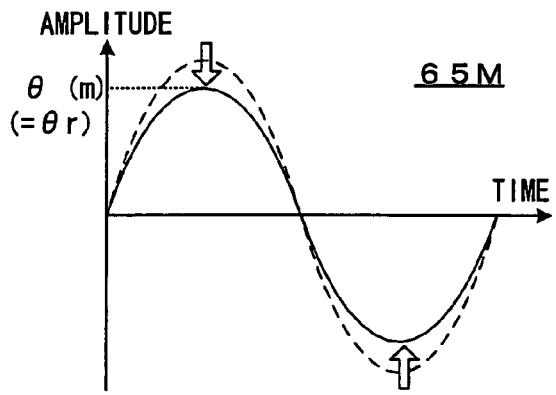
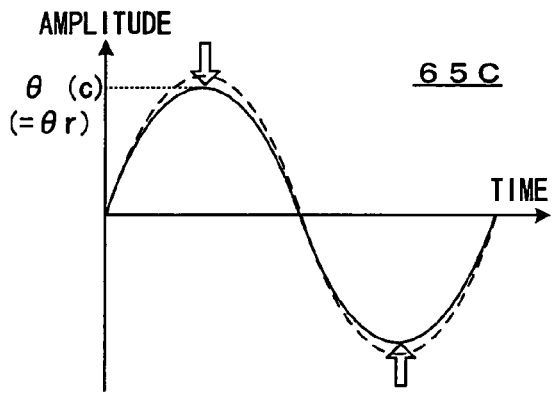
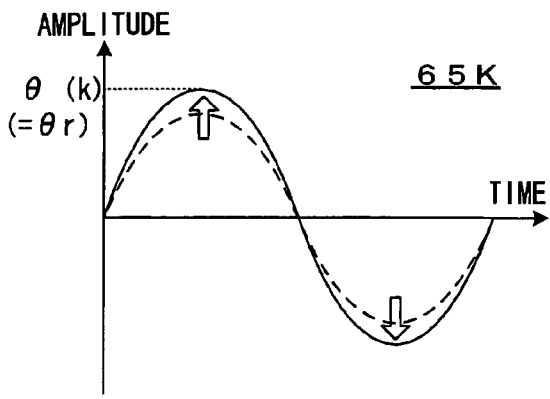

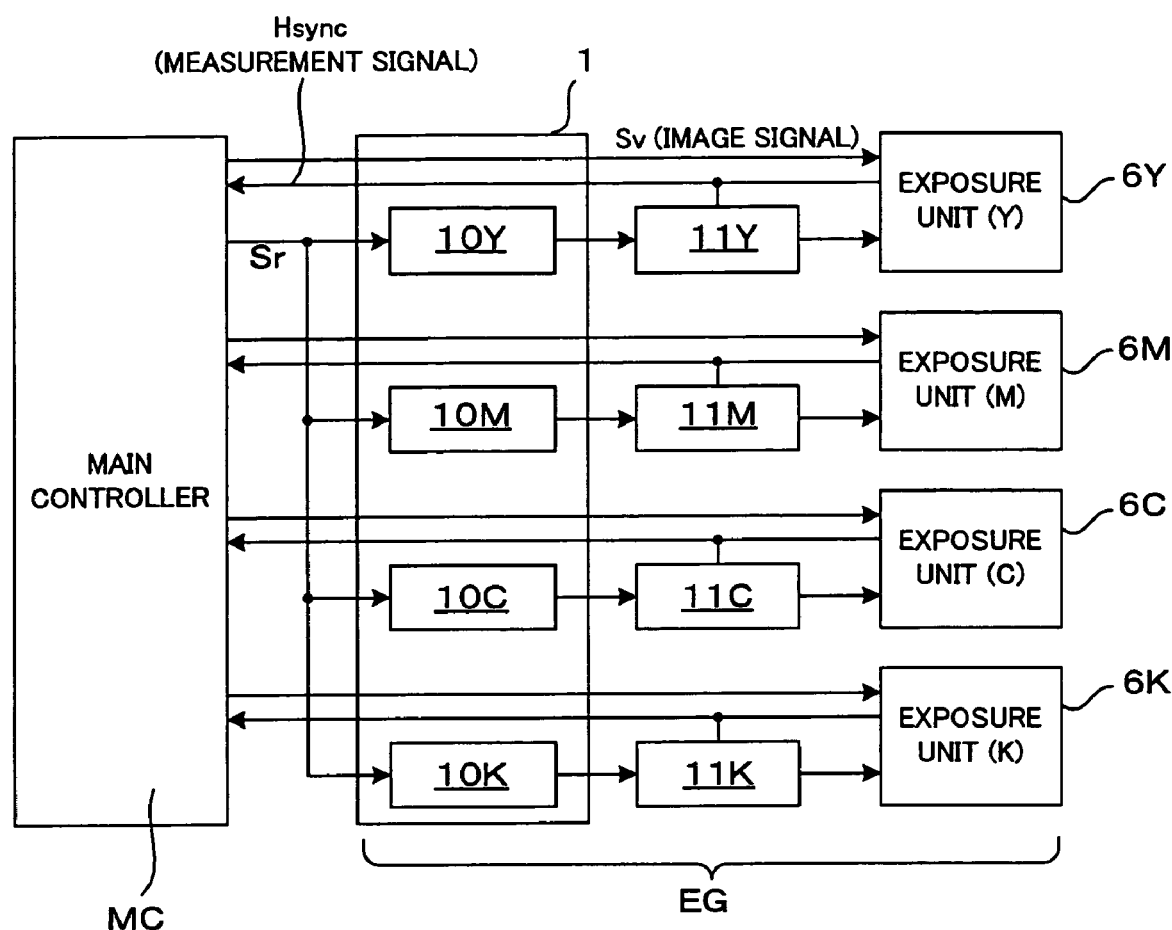
F I G. 10

APPARATUS FOR AND METHOD OF FORMING IMAGE USING OSCILLATION MIRROR

CROSS REFERENCE TO RELATED APPLICATION

The disclosure of Japanese Patent Applications enumerated below including specification, drawings and claims is incorporated herein by reference in its entirety:
No.2004-124573 filed Apr. 20, 2004;
No.2005-65493 filed Mar. 9, 2005;
No.2005-70319 filed Mar. 14, 2005; and
No.2005-70320 filed Mar. 14, 2005.

BACKGROUND OF THE INVENTION

1. Field of the Invention

The present invention relates to an image forming apparatus and an image forming method wherein a light beam from a light source is modulated according to an image signal from a controller while the light beam is scanned in a main-scan direction by means of an oscillation mirror in resonant oscillations thereby forming a latent image on a latent image carrier.

2. Description of the Related Art

In electrophotographic image forming apparatuses such as printers, copiers and facsimiles, an image forming command is applied to a controller from an external apparatus such as a host computer responding to a request from a user wanting to form an image. The controller in turn converts the image forming command into data in a format suitable for directing operations of an engine. The engine is controlled based on the data, so as to form an image corresponding to the image forming command on a sheet (recording material) such as copy sheet, transfer sheet, paper or transparent sheet for OHP. Specifically, a light source of an exposure unit in the engine emits a light beam modulated in correspondence to the image data, as ON/OFF controlled based on the image data included in the image forming command. The light beam is scanned in the main-scan direction by means of a deflector of the exposure unit, thereby forming a latent image corresponding to the image data on a latent image carrier such as a photosensitive member. Then, the latent images are developed with toners so as to form toner images.

Aiming at downsizing and speeding up the deflector, it has heretofore been proposed to employ a resonant oscillation mirror as the deflector, the oscillation mirror disclosed in, for example, Japanese Unexamined Patent Publication No.1-302317. In this apparatus, the oscillation mirror is driven into resonant oscillations by matching a frequency of a drive signal applied to the oscillation mirror (hereinafter, referred to as "drive frequency") with a natural resonant frequency of the oscillation mirror, whereby a relatively great amplitude is attained. The light beam from the light source is guided to the oscillation mirror in resonant oscillations so as to scan the light beam.

SUMMARY OF THE INVENTION

In cases, the oscillation mirror may encounter the variations of resonant frequency, which result from how the oscillation mirror was processed in the fabrication process thereof or from the ambient temperature thereof. In the event of such frequency variations, the light beam on the latent image carrier is varied in scan speed so that the latent image formed on the latent image carrier is elongated or shortened along the main-scan direction. In the apparatus disclosed in the above Japanese Unexamined Patent Publication No.1-302317, therefore, a control unit for driving the oscillation mirror while controlling the amplitude of the drive signal is provided at the engine. Thus, the amplitude of the drive signal is so adjusted as to ensure that the light beam is scanned on the latent image carrier at a constant speed.

In the conventional apparatus, the oscillation mirror is drivably controlled in the engine provided with the exposure unit or in a closed system. That is, synchronism between the controller and the control unit is not provided, so that the control unit operates out of synchronism with the controller. Accordingly, operations with respect to a sub-scan direction substantially perpendicular to the main-scan direction are performed asynchronously and hence, a latent-image forming position may be deviated (deviated linear latent image) with respect to the sub-scan direction. This constitutes one of the major factors causing the degradation of image quality.

In cases, a so-called tandem-type image forming apparatus may be used for forming a color image. In this image forming apparatus, the engine is provided with image forming units for plural colors, say four colors including yellow (Y), magenta (M), cyan (C) and black (K). The controller, in turn, generates four color image signals in correspondence to the received image forming command and outputs the four color image signals to the respectively corresponding image forming units. Then, toner images of four colors are formed by these image forming units and superimposed on each other on a transfer medium such as an intermediate transfer belt, so as to form the color image. Therefore, if the positions of the latent images of the individual colors, formed by the exposure units disposed in the respective image forming units, are deviated from each other, the resultant image suffers color misregistration and is degraded in the image quality. In the tandem-type image forming apparatuses, therefore, it is a crucial point to prevent not only the deviation of the latent-image forming position for each of the colors but also the deviation among the positions of the latent images of all the colors.

It is a primary object of the invention to prevent a deviation of the latent-image forming position with respect to a sub-scan direction substantially perpendicular to a main-scan direction, so as to ensure the formation of the color image of high quality in an image forming apparatus.

According to a first aspect of the present invention, there is provided an image forming apparatus and a method of forming an image by operating the apparatus. The apparatus comprises: a controller which outputs an image signal corresponding to a received image forming command; and an engine which forms a latent image on a latent image carrier by scanning a light beam, modulated according to the image signal from the controller, in a main-scan direction by means of an oscillation mirror in resonant oscillations. The controller generates a reference signal and outputs the reference signal to the engine. A drive signal controlling section controls a drive signal for driving the oscillation mirror in a manner to establish the predetermined relationship between a phase of the reference signal and a phase of a drive period signal related to a drive period of the oscillation mirror. Therefore, a latent-image forming position with respect to a sub-scan direction substantially perpendicular to the main-scan direction is adjusted by way of the phase adjustment between the reference signal and the drive period signal, so that a linear latent image may be prevented from deviating with respect to the sub-scan direction. As a result, images may be formed in high quality.

According to a second aspect of the present invention, there is provided an image forming apparatus and a method of forming an image by operating the apparatus. The apparatus comprises: a controller which outputs image signals of plural colors corresponding to a received image forming command; and an engine which is provided with an image forming unit in correspondence to each of the plural colors, each of the image forming units operative to form a latent image on a latent image carrier by scanning a light beam, modulated according to the image signal of the corresponding color applied from the controller, in a main-scan direction by means of an oscillation mirror resonantly oscillating according to a drive signal, and to form a toner image by developing the latent image with a toner of the corresponding color, and which forms a color image by superimposing the toner images of the plural colors on a transfer medium. The controller generates a reference signal common to the plural colors and outputs the reference signal to the drive signal controlling sections for the plural colors at a time. The light beam related to any of the toner colors is scanned based on the single reference signal by means of the oscillation mirror resonantly oscillating. Hence, the latent-image forming positions for the individual toner colors may be prevented from deviating relative to each other with respect to a sub-scan direction substantially perpendicular to the main-scan direction, so that the color images may be formed favorably.

According to a third aspect of the present invention, there is provided an image forming apparatus and a method of forming an image by operating the apparatus. The apparatus comprises: a controller which outputs an image signal corresponding to a received image forming command; and an engine which forms a latent image on a latent image carrier by scanning a light beam, modulated according to the image signal from the controller, in a main-scan direction by means of an oscillation mirror in resonant oscillations. The controller generates a reference signal and outputs the reference signal to the engine, while the engine includes a reference drive signal generator which generates a reference drive signal having a predetermined drive frequency. A drive signal for driving the oscillation mirror is controlled based on the reference signal and the reference drive signal in a manner to establish a predetermined relationship between a phase of the reference signal and a phase of the reference drive signal. Therefore, a latent-image forming position with respect to a sub-scan direction substantially perpendicular to the main-scan direction is adjusted by way of the phase adjustment between the reference signal and the reference drive signal, so that a linear latent image may be prevented from deviating with respect to the sub-scan direction. As a result, images may be formed in high quality.

According to a fourth aspect of the present invention, there is provided an image forming apparatus and a method of forming an image by operating the apparatus. The apparatus comprises: a controller which outputs image signals of plural colors corresponding to a received image forming command; and an engine which is provided with an image forming unit in correspondence to each of the plural colors, each of the image forming units operative to form a latent image on a latent image carrier by scanning a light beam, modulated according to the image signal of the corresponding color applied from the controller, in a main-scan direction by means of an oscillation mirror resonantly oscillating according to a drive signal, and to form a toner image by developing the latent image with a toner of the corresponding color, and which forms a color image by superimposing the toner images of the plural colors on a transfer medium. The controller generates a reference signal common to the plural colors and outputs the reference signal to the drive signal controlling sections for the plural colors at a time. The light beam related to any of the toner colors is scanned based on the single reference signal by means of the oscillation mirror resonantly oscillating. Hence, the latent-image forming positions for the individual toner colors may be prevented from deviating relative to each other with respect to a sub-scan direction substantially perpendicular to the main-scan direction, so that the color images may be formed favorably.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF THE DRAWINGS

FIG. 2 is a block diagram showing an electrical arrangement of the image forming apparatus of FIG. 1;

FIGS. 6A and 6B are diagrams schematically showing the resonance control processing performed on the deflector prior to the color image formation;

FIGS. 9A and 9B are diagrams schematically showing the amplitude control processing performed on the deflector prior to the color image formation;

FIG. 10 is a block diagram showing an image forming apparatus according to the third embodiment of the invention;

DETAILED DESCRIPTION OF THE PREFERRED EMBODIMENTS

First Embodiment

Figure 1:
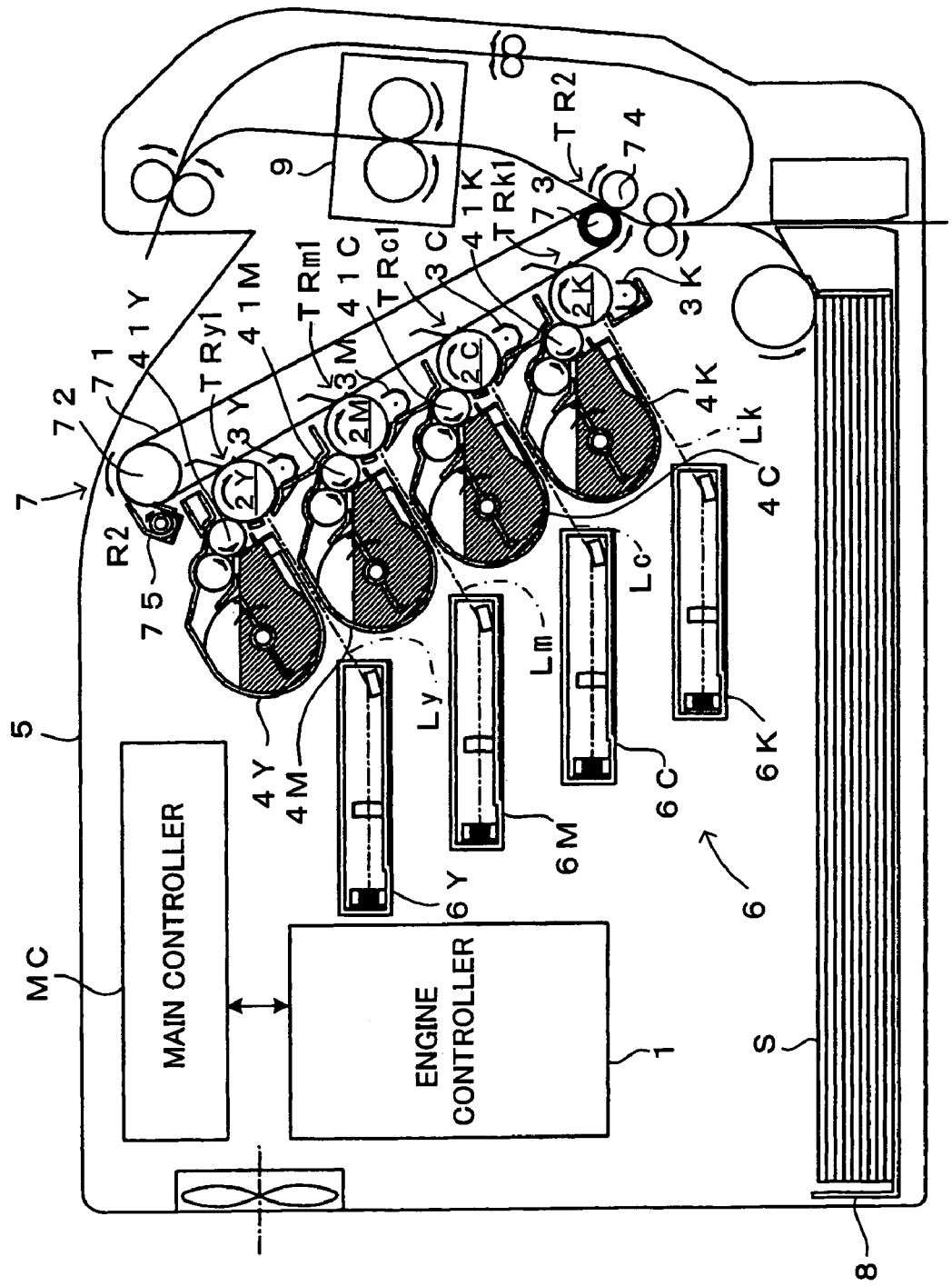
FIG. 1 is diagram showing a preferred embodiment of an image forming apparatus according to the present invention.

FIG. 1 is a diagram showing an image forming apparatus according to a first embodiment of the invention. FIG. 2 is a block diagram showing an electrical arrangement of the image forming apparatus of FIG. 1. This image forming apparatus is a so-called tandem color printer wherein photosensitive members 2Y, 2M, 2C, 2K for four colors of yellow Y, magenta M, cyan C and black K, as latent image carriers, are juxtaposed in an apparatus body 5. The apparatus is adapted to form a full-color image by superimposing toner images on the individual photosensitive members 2Y, 2M, 2C, 2K, or to form a monochromatic image using only the toner image of black (k). The image forming apparatus operates as follows. When an external apparatus such as a host computer applies an image forming command to a main controller MC in response to a request from a user wanting to form an image, the main controller MC sends image signals, a reference signal, control signals and the like. In response to the signals from the main controller MC, individual parts of an engine EG operate to form the image corresponding to the image forming command on a sheet S such as copy sheet, transfer sheet, paper and transparent sheet for OHP. Thus, the main controller 11 corresponds to a "controller" of the present invention.

In the engines EG, charger units, developing units, exposure units and cleaners are provided in correspondence to respective ones of the four photosensitive members 2Y, 2M, 2C, 2K. Thus, the photosensitive member, the charger unit, the developing unit, the exposure unit and the cleaner are provided on a per-toner-color basis, thereby constituting an image forming unit for forming a toner image of each corresponding toner color. An engine controller 1 disposed in the engine EG controls individual parts of the image forming units according to signals from the main controller MC, so as to carry out image formation. It is noted here that these image forming units (the photosensitive members, charger units, developing units, exposure units and cleaners) for the respective color components are arranged the same way. Therefore, the arrangement for the yellow color component is described here while individual parts of the arrangements for the other color components are represented by equivalent reference characters, respectively, and the description thereof is dispensed with.

The photosensitive member 2Y is arranged to be rotatable in a direction of an arrow in FIG. 1 (sub-scan direction). More specifically, the photosensitive member 2Y is mechanically connected with a drive motor (not shown) at one end thereof, so as to be drivably controlled based on a rotative drive command from the engine controller 1. Thus, the photosensitive member 2Y is driven into rotary motion. A charger unit 3Y, a developing unit 4Y and a cleaner (not shown) are arranged around the photosensitive member 2Y along the rotational direction. The charger unit 3Y comprises a scorotron charger, for example, which is applied with a charging bias from the engine controller 1 thereby uniformly charging an outside surface of the photosensitive member 2Y to a predetermined surface potential. An exposure unit 6Y emits a scan light beam Ly toward the outside surface of the photosensitive member 2Y so charged by the charger unit 3Y. Thus, an electrostatic latent image corresponding to yellow image data included in the image forming command is formed on the photosensitive member 2Y. Arrangements and operations of the exposure unit 6 (6Y, 6M, 6C, 6K) and a control unit (drive signal controlling section 10 and mirror controlling section 11) for controlling the exposure unit will be described in details hereinlater.

The electrostatic latent image thus formed is developed with toner by means of the developing unit 4Y The. developing unit 4Y contains therein a yellow toner. When the engine controller 1 applies a developing bias to a developing roller 41Y, the toner carried on the developing roller 41Y is made to locally adhere to surface portions of the photosensitive member 2Y according to the surface potentials thereof. As a result, the electrostatic latent image on the photosensitive member 2Y is visualized as a yellow toner image. A DC voltage or a DC voltage superimposed with an AC voltage may be used as the developing bias to be applied to the developing roller 41Y. Particularly in an image forming apparatus of a non-contact development system wherein the photosensitive member 2Y is spaced away from the developing roller 41Y and the toner is made to jump between these members for accomplishing the development with toner, the developing bias may preferably have a waveform formed by superimposing a sinusoidal, triangular-wave or rectangular-wave AC voltage on the DC voltage for the purpose of efficient toner jumps.

The yellow toner image developed by the developing unit 4Y is primarily transferred onto an intermediate transfer belt 71 of a transfer unit 7 in a primary transfer region TRy1. The other members for the other color components than yellow are arranged absolutely the same way as those for yellow. A magenta toner image, a cyan toner image and a black toner image are formed on the respective photosensitive members 2M, 2C, 2K and are primarily transferred onto the intermediate transfer belt 71 in respective primary transfer regions TRm1, TRc1, TRk1.

The transfer unit 7 includes: an intermediate transfer belt 71 entrained about two rollers 72, 73; and a belt driver (not shown) operative to drive the roller 72 into rotation thereby rotating the intermediate transfer belt 71 in a predetermined rotational direction R2. The transfer unit is further provided with a secondary transfer roller 74 which confront the roller 73 with the intermediate transfer belt 71 interposed therebetween and which is adapted to be moved into contact with or away from a surface of the belt 71 by means of an unillustrated electromagnetic clutch. In a case where a color image is transferred to the sheet S, primary transfer timings are controlled to superimpose the individual toner images on each other thereby to form the color image on the intermediate transfer belt 71. Then, the color image is secondarily transferred onto the sheet S taken out from a cassette 8 and delivered to a secondary transfer region TR2 between the intermediate transfer belt 71 and the secondary transfer roller 74. In a case where a monochromatic image is transferred onto the sheet S, on the other hand, only a black toner image is formed on the photosensitive member 2k and the monochromatic image is secondarily transferred onto the sheet S delivered to the secondary transfer region TR2. The sheet S thus secondarily transferred with the image is transported to a discharge tray at a top surface of the apparatus body via a fixing unit 9.

After the primary transfer of the toner images to the intermediate transfer belt 71, the photosensitive members 2Y, 2M, 2C, 2K have their the surface potentials reset by unillustrated static eliminators. In addition, the photosensitive members are removed of the toners remaining on their surfaces by means of the cleaners. Then, the photosensitive members are subjected to the subsequent charging by means of the charger units 3Y, 3M, 3C, 3K.

Disposed in the vicinity of the roller 72 is a transfer belt cleaner 75. The cleaner 75 is adapted to be moved into contact with or away from the roller 72 by means of an unillustrated electromagnetic clutch. As moved to the roller 72, the cleaner 75 holds its blade against the surface of the intermediate transfer belt 71 entrained about the roller 72 thereby removing the toner remaining on the outside surface of the intermediate transfer belt 71 after the secondary image transfer.

Figure 3:
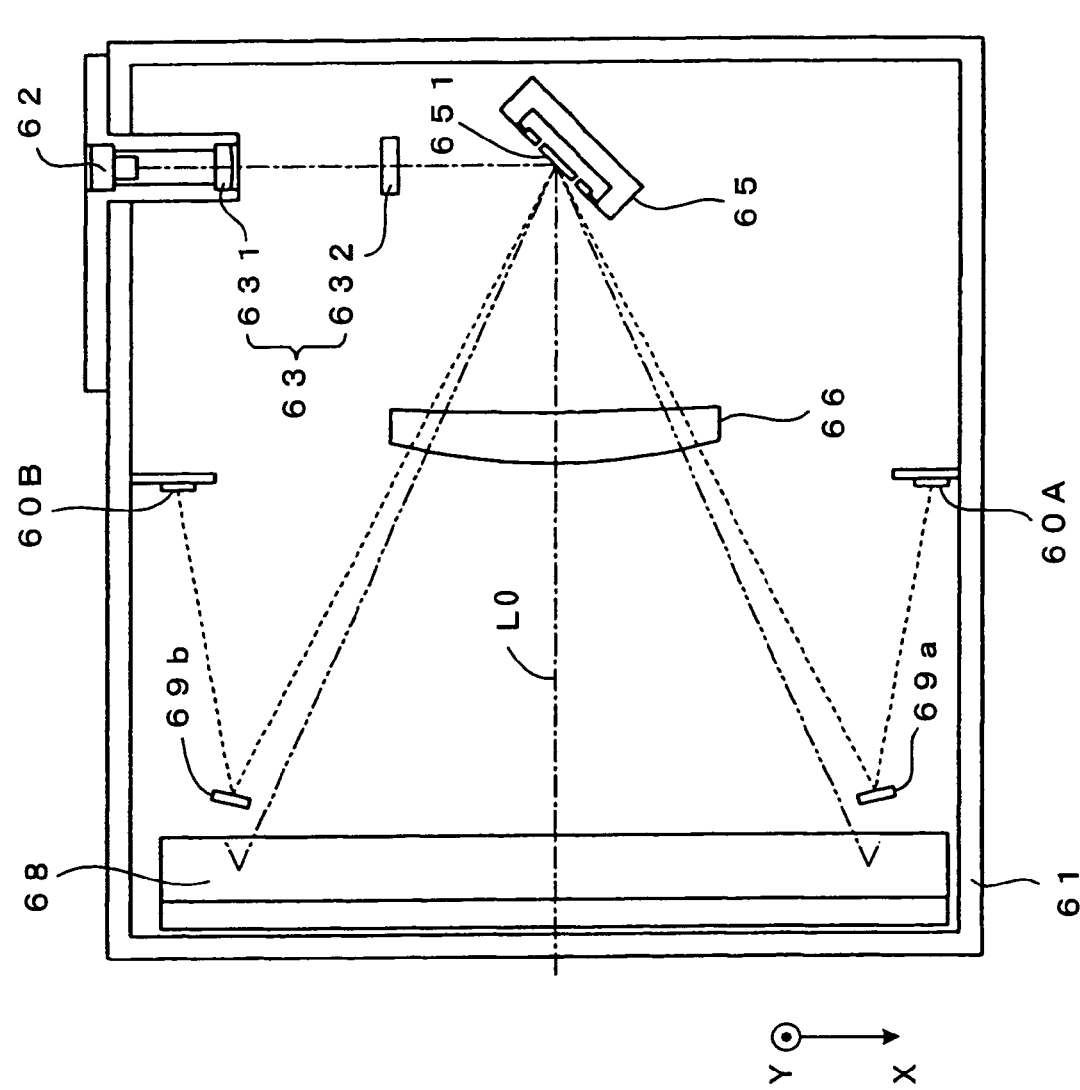
FIG. 3 is a sectional view taken on a main-scan direction for showing an arrangement of the exposure unit provided in the image forming apparatus of FIG. 1.
Figure 4:
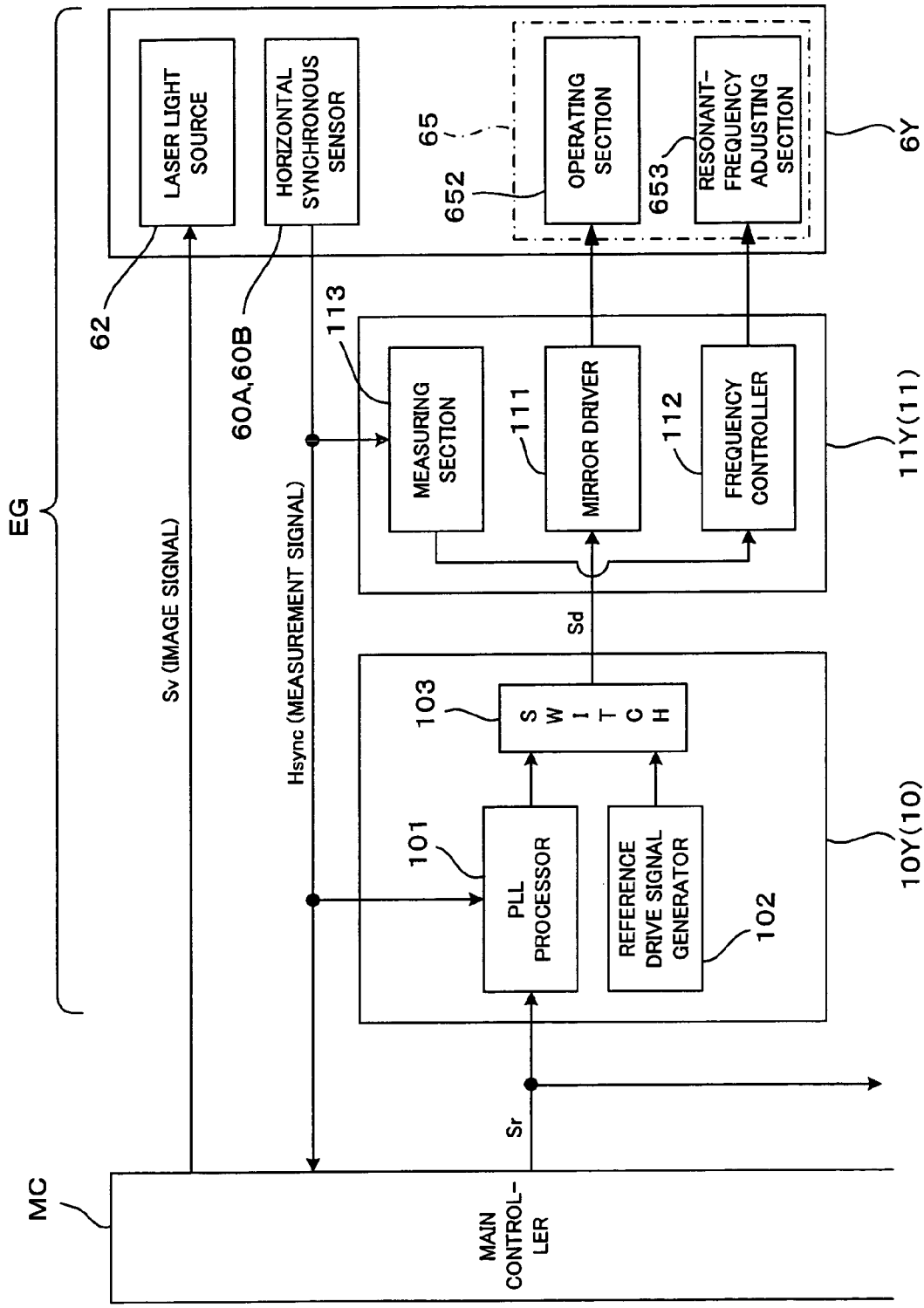
FIG. 4 is a block diagram showing an arrangement of the exposure unit and the a controlling section in the image forming apparatus of FIG. 1.

FIG. 3 is a sectional view taken on a main-scan direction for showing an arrangement of the exposure unit provided in the image forming apparatus of FIG. 1. FIG. 4 is a block diagram showing arrangements of the exposure unit and a controlling section for controlling the exposure unit (a mirror controlling section and a drive signal controlling section) in the image forming apparatus of FIG. 1. Referring to these figures, the arrangements and operations of the exposure unit 6, the mirror controlling section 11 and the drive signal controlling section 10 are described as below. The exposure unit 6, the drive signal controlling section 10 and the mirror controlling section 11 for the respective color components are arranged the same ways. Therefore, the arrangement for the yellow color component is described here while the individual parts of the arrangements for the other color components are represented by equivalent reference characters, respectively, and the description thereof is dispensed with.

The exposure unit 6Y (6M, 6C, 6K) includes an exposure casing 61. The exposure casing 61 has a single exposure light source 62 fixed thereto so as to be capable of emitting a light beam from the laser light source 62. As shown in FIG. 4, a yellow image signal Sv from the main controller MC is inputted to the laser light source 62. That is, when the main controller MC is applied with an image forming command from a host computer responding to a request from a user wanting to form an image, the main controller MC outputs four color image signals Sv corresponding to the image forming command to the respective exposure units 6 of individually corresponding colors. Accordingly, the image signal Sv for yellow is a signal corresponding to yellow image data included in the image forming command. Thus, the laser light source 62 is ON/OFF controlled based on this image signal Sv, so that the laser light source 62 emits a light beam Ly modulated according to the yellow image data.

Within the exposure casing 61, there are provided a collimator lens 631, a cylindrical lens 632, a deflector 65 and a scanning lens 66 for scanning the light beam from the laser light source 62 on the surface of the photosensitive member 2Y. Specifically, the light beam from the laser light source 62 is shaped into a collimated beam of a suitable size by means of the collimator lens 631 and then, is made incident on the cylindrical lens 632 powered only in a sub-scan direction Y. By adjusting the cylindrical lens 631, the collimated beam is focused onto place near a deflective mirror 651 of the deflector 65 with respect to the sub-scan direction Y. According to the embodiment, a combination of the collimator lens 631 and the cylindrical lens 632 functions as a beam shaping system 63 for shaping the light beam from the laser light source 62.

The deflector 65 is formed using a micromachining technique which applies a semiconductor fabrication technique in integrally forming micro machines on a semiconductor substrate. The deflector comprises an oscillation mirror adapted for resonant oscillations. Specifically, the deflector 65 is capable of deflecting the light beam in a main-scan direction X by means of the deflective mirror 651 in resonant oscillations. More specifically, the deflective mirror 651 is carried in a manner to be oscillatble about an oscillatory axis (torsion spring) extending substantially perpendicular to the main-scan direction. The deflective mirror oscillates about the oscillatory axis according to an external force applied from an operating section 652. The operating section 652 applies an electrostatic, electromagnetic or mechanical external force to the deflective mirror 651 based on a mirror drive signal from a mirror driver 111 of the mirror controlling section 11Y, thereby causing the deflective mirror 651 to oscillate at a frequency of the mirror drive signal. The operating section 652 may adopt any of the drive methods based on electrostatic attraction, electromagnetic force and mechanical force. These drive methods are known in the art and hence, the description thereof is dispensed with.

The deflector 65 driven in this manner is provided with a resonant-frequency adjusting section 653 as disclosed in Japanese Unexamined Patent Publication No.9-197334, for example. Thus, the deflector 65 is adapted to vary the resonant frequency thereof. This resonant-frequency adjusting section 653 includes an electrical resistance element formed at the torsion spring (not shown) of the deflector 65. The electric resistance element is electrically connected with a frequency controlling section 112 of the mirror controlling section 11Y. The frequency controlling section 112 controls power supply to the electrical resistance element so as to vary the temperature of the torsion spring. Thus is varied the spring constant of the torsion spring so that the resonant frequency of the deflector 65 can be varied. Hence, in a case where the resonant frequency does not coincide with the frequency of the mirror drive signal (drive signal Sd), as will be described hereinlater, the embodiment operates the resonant-frequency adjusting section 653 to vary the resonant frequency of the deflector 65 for substantially matching the resonant frequency with the drive frequency. It is noted that a specific arrangement for varying the resonant frequency of the deflector 65 is not limited to this, and any conventionally known arrangement may be adopted.

The mirror driver 111 can be reprogrammed to change drive conditions including the frequency, voltage and the like of the mirror drive signal. As will be described hereinlater, the mirror driver can be reprogrammed to change the frequency of the mirror drive signal as circumstance demand. The mirror driver is also adapted to adjust an amplitude value by changing the voltage of the mirror drive signal.

The light beam deflected by the deflective mirror 651 of the deflector 65 is directed toward the scanning lens 66. According to the embodiment, the scanning lens 66 is arranged to have a substantially constant F-value with respect to the overall effective scan region on the surface of the photosensitive member 2. Therefore, the light beam deflected to the scanning lens 66 passes therethrough to be focused onto the effective scan region on the photosensitive member 2 in a spot of a substantially constant diameter. Thus, the light beam is scanned in parallel to the main-scan direction X so as to form, on the photosensitive member 2, a linear latent image extending in the main-scan direction X.

In this embodiment, reflective mirrors 69a, 69b are employed for guiding a start end or a terminal end of a scan path of the scanned light beam to horizontal synchronous sensors 60a, 60B, as shown in FIG. 3. These reflective mirrors 69a, 69b and the horizontal synchronous sensors 60A, 60B are disposed outside of a sweep surface formed by sweeping the light beam during the scanning on the effective scan region. Furthermore, the reflective mirrors 69a, 69b are disposed substantially symmetrically with respect to an optical axis of the light beam scanned substantially on the center of the effective scan region. Therefore, the horizontal synchronous sensors 60A, 60B may be commensurately considered to be disposed substantially symmetrically with respect to the optical axis.

Scan-beam detection signals from these horizontal synchronous sensors 60A, 60B are transmitted to a measuring section 113 of the mirror controlling section 11Y so that the measuring section 113 calculates a drive information such as a scan time during which the light beam is scanned on the effective scan region, a drive period or the like. The information from the measuring section 111 is transmitted to a frequency controlling section 112, so that the frequency controlling section 112 can reprogram the resonant frequency of the deflector 65.

The horizontal synchronous signals Hsync from the horizontal synchronous sensors 60A, 60B are directly inputted to the main controller MC, thus functioning as a synchronous signal for synchronizing the light beam being scanned on the effective scan region in the main-scan direction X. That is, the horizontal synchronous sensors 60A, 60B function as horizontal synchronous read sensors for providing the horizontal synchronous signal Hsync.

Further according to the embodiment, the horizontal synchronous sensors 60A, 60B function as a "detector unit" of the invention, whereas the detection signal Hsync is defined as a "drive period signal" of the invention, which is inputted to the drive signal controlling section 10Y of the engine controller 1. The drive signal controlling section 10Y includes a PLL (=phase-locked loop) processor 101. The detection signals Hsync outputted from the horizontal synchronous sensors 60A, 60B are inputted to the PLL processor 101.

The PLL processor 101 is electrically connected with the main controller MC, so as to be capable of receiving a reference signal Sr from the main controller MC. The reference signal Sr is common to the four toner colors and is applied to the drive signal controlling sections for the respective colors at a time. Based on the reference signal Sr from the main controller MC and the detection signal Hsync, the PLL processor 101 performs a PLL processing such as to establish a predetermined relationship between a phase of the reference signal and a phase of the drive period signal, thereby controlling the drive signal.

Besides the aforesaid PLL processor 101, this embodiment is further provided with a reference drive signal generator 102 for controlling the drive signal Sd. The reference drive signal generator 102 generates a reference drive signal having a preset drive frequency, and may be comprised of a memory storing the reference drive signal, an oscillator circuit for generating the reference drive signal, and the like. A switch 103 selectively switches between the output signal from the PLL processor 101 and the output signal from the reference drive signal generator 101, applying either one of the output signals to the mirror controlling section 11Y as the drive signal Sd. A switching timing and a mode of selecting the drive signal are as follows.

When the apparatus of the aforementioned arrangement is applied with the image forming command in a state where the deflector 65 is out of oscillations, the apparatus performs a start-up process before starting an image forming operation. The start-up process makes adjustment for ensuring that the deflector 65 may preferably scan the light beam in synchronism with the main controller MC. More specifically, a drive processing, a resonance control processing and the PLL processing are performed as the start-up process.

Figure 5:
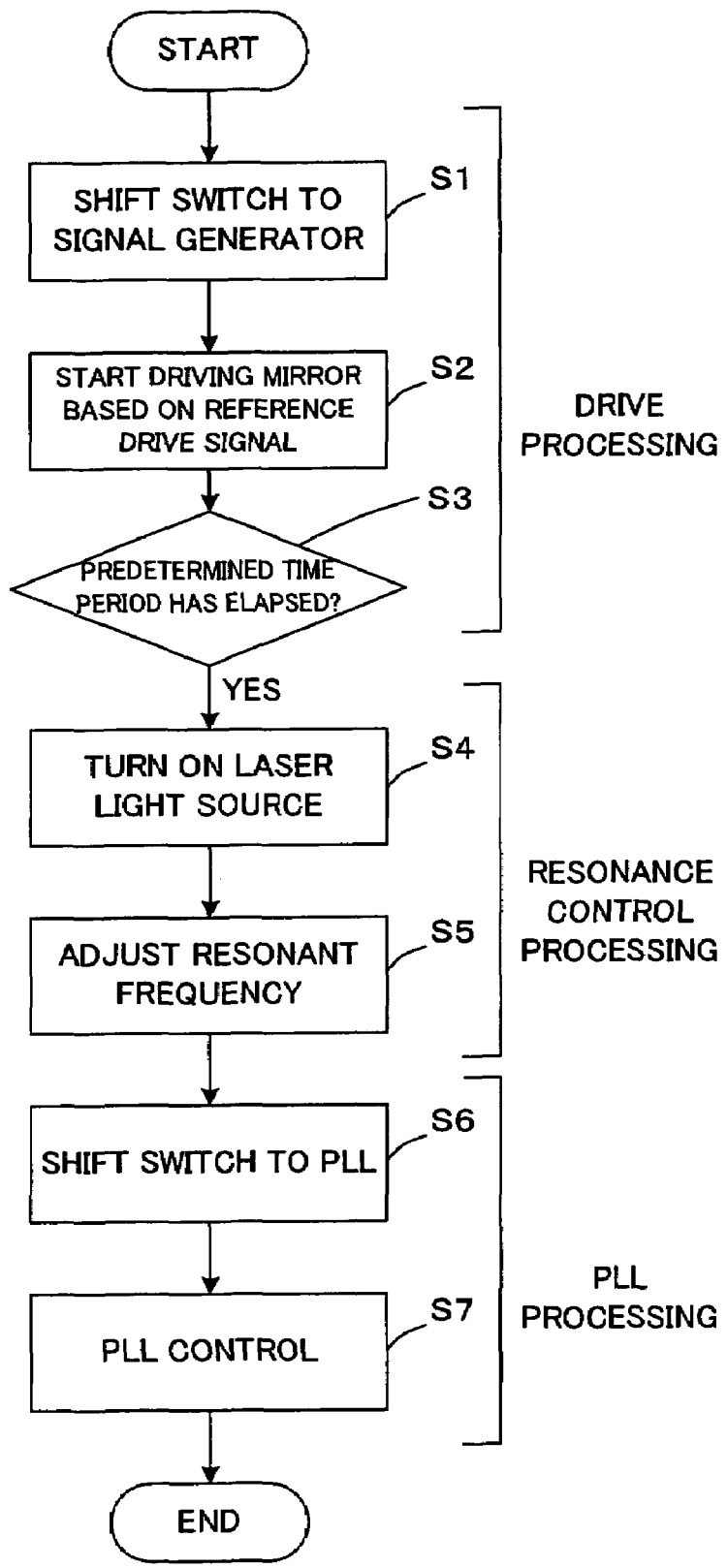
FIG. 5 is a flow chart showing the start-up process performed by the image forming apparatus of FIG. 1.

FIG. 5 is a flow chart showing the processings performed in the image forming apparatus of FIG. 1. FIGS. 6A and 6B are a group of diagrams schematically showing the resonance control processing performed on the deflector prior to the color image formation. While the description will be made on a case where a color-image forming command is applied asd the image forming command, the following operations are performed only on the black color when a monochromatic-image forming command is applied.

When the color-image forming command is applied, the start-up process for the deflector 65 is performed with respect to the yellow color. Firstly in Step S1, the switch 103 is shifted to the reference drive signal generator 102 of the drive signal controlling section 10Y. Hence, the reference drive signal outputted from the reference drive signal generator 102 is applied, as the drive signal Sd, to the mirror driver 111 of the mirror controlling section 11Y. The mirror driver 111 in turn, generates a mirror drive signal based on the drive signal Sd such as to operate the operating section 652 at a drive frequency Fd. This causes the deflective mirror 651 of the deflector 65 to start oscillating at the drive frequency Fd (Step S2). At the start-up stage of driving the deflector, the deflector 65 is so driven based on the reference drive signal generated by the reference drive signal generator 102. Therefore, the deflective mirror 651 of the deflector 65 can be driven into resonant oscillations positively and quickly.

The deflective mirror 651 oscillates at the frequency Fd. However, in a case where a resonant frequency Fry of the deflector 65 is deviated from the drive frequency Fd, as shown in FIG. 6A for example, a maximum amplitude θ(y) of the deflective mirror 651 is significantly decreased from the maximum amplitude during the resonant oscillations. Hence, after the lapse of a predetermined period of time (Step S3), the resonance control processing is performed on the yellow deflector 65.

In the resonance control processing, the main controller MC outputs the image signal Sv to the laser light source 62 so as to turn on the laser light source 62 (Step S4). Alternatively, the engine controller 1 may also apply an image signal suitable for the resonance control processing to the laser light source 62 so as to carry out the resonance control processing in a manner described as below. At the point of time that the laser light source 62 is turned on in this manner, the deflector 65 is already in resonant oscillations so as to scan the light beam on the surface of the photosensitive member 2Y. This prevents the light beam from being intensively irradiated on a part of the photosensitive member 2Y. In synchronism with the scanning of the light beam, the horizontal synchronous sensors 60A, 60B output the horizontal synchronous signal Hsync. In the subsequent Step S5, the frequency controlling section 112 controls power supply to the electrical resistance element based on the sensor output so as to vary the temperature of the torsion spring of the deflector 65, whereby a resonant characteristic of the deflector 65 is shifted from a broken line (pre-adjustment characteristic) to the drive frequency side, as shown in FIG. 6B. Thus, the resonant frequency Fry of the deflector 65 is substantially matched with the drive frequency Fd, so that the amplitude θ(y) is at the maximum amplitude.

When the resonance control processing is thus completed, the switch 103 is shifted to the PLL processor 101 of the drive signal controlling section 10Y (Step S6). Based on the reference signal Sr from the main controller MC and the detection signal Hsync, the PLL processor performs the PLL processing such as to establish the predetermined relationship between the phase of the reference signal and the phase of the drive period signal, thereby controlling the drive signal Sd (Step S7). The drive signal Sd is applied to the mirror driver 111 of the mirror controlling section 10Y via the switch 103. As a result, the mirror driver 111 drives the deflective mirror 651 of the deflector 65 into resonant oscillations at the drive frequency Fd while maintaining the above relationship. This permits the scan light beam Ly to be stably scanned in synchronism with the reference signal from the main controller MC. When the stabilization of the scan speed is completed, the laser light source 62 is turned off and a control signal such as a Ready signal is outputted to the main controller MC thereby to complete the start-up process on the yellow exposure unit 6Y. The same drive processing, resonance control processing and PLL processing (Steps S1 to S7) as the above are also performed on the other toner colors than yellow.

According to the embodiment as described above, the horizontal synchronous signal Hsync is inputted to the drive signal controlling section 10 (10Y, 10M, 10C, 10K) as the drive period signal related to a drive period of the deflective mirror 651. Then, the drive signal controlling section 10 controls the drive signal Sd in a manner to establish the predetermined relationship between the phase of the reference signal Sr and the phase of the horizontal synchronous signal Hsync, thereby operating the deflector 65 in synchronism with the reference signal Sr. Therefore, the latent-image forming position with respect to the sub-scan direction Y is adjusted by way of the phase adjustment between the reference signal Sr and the horizontal synchronous signal Hsync, so that a linear latent image may be prevented from deviating with respect to the sub-scan direction Y. As a result, images may be formed in high quality.

In this embodiment, the color image is formed by a so-called tandem system. If the latent-image forming positions in the individual exposure units 6 (6Y, 6M, 6C, 6K) are deviated relative to each other, there will occur color misregistration which degrades the image quality. According to the embodiment, however, the main controller MC generates the reference signal Sr common to all the colors and outputs the signal to the respective drive signal controlling sections 10Y, 10M 10C, 10K at a time. Therefore, the aforesaid PLL processings based on the reference signal Sr are carried out simultaneously. Accordingly, the light beam related to any of the toner colors is scanned based on the single reference signal Sr by means of the deflective mirror 651 resonantly oscillating at the predetermined drive frequency Fd. Hence, the latent-image forming positions for the individual toner colors may be prevented from deviating relative to each other with respect to the sub-scan direction Y, so that the color images may be formed favorably.

Furthermore, the frequency controlling section 112 controls the resonant-frequency adjusting section 653 thereby to make adjustment for matching the resonant frequency of the deflector 65 substantially with the drive frequency Fd (resonance control processing). Therefore, even if the resonant frequency of the deflector 65 is deviated from the drive frequency Fd at the start-up stage of driving, the resonance control processing permits the deflector 65 to oscillate resonantly at the predetermined drive frequency Fd and in the maximum amplitude. It is thus ensured that the image formation is performed in a favorable and stable manner.

In the case of the color image formation, the drive processing, the resonance control processing and the PLL processing (Steps S1 to S7) are performed on the respective toner colors, as described above. In the case of the monochromatic image formation, however, these processings are performed only on the black color. Hence, the start-up process may be carried out efficiently.

Second Embodiment

Figure 7:
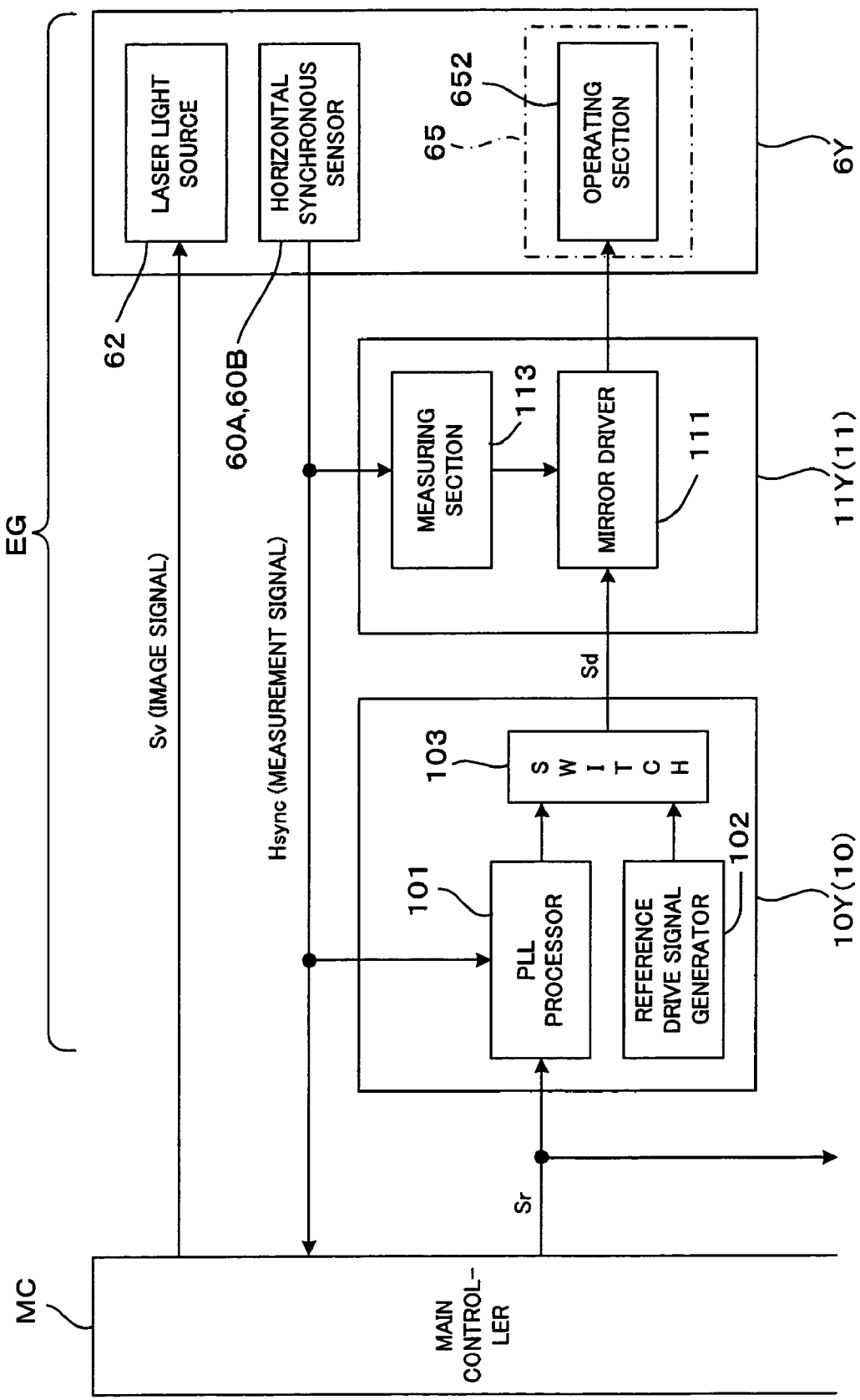
FIG. 7 is a block diagram showing arrangements of an exposure unit and a controlling section according to a second embodiment of the invention.

FIG. 7 is a block diagram showing arrangements of an exposure unit and a controlling section (drive signal controlling section and mirror controlling section) for controlling the exposure unit according to a second embodiment of the invention. The second embodiment principally differs from the first embodiment in that the resonance control processing is not performed, whereas an amplitude control processing is performed based on the horizontal synchronous signal Hsync. Except for this, the second embodiment is arranged the same way as the first embodiment. The following description is made on the arrangement and operations of the second embodiment, focusing on the difference from the first embodiment.

In the second embodiment, the scan-beam detection signal Hsync provided by the horizontal synchronous sensors 60A, 60B is transmitted to the measuring section 113 of the mirror controlling section 11 (11Y, 11M, 11C, 11K). The measuring section 103 calculates a drive information such as a scan time during which the light beam is scanned on the effective scan region, a drive period or the like. The drive information calculated by the measuring section 103 is transmitted to the mirror driver 111. Based on the drive information thus transmitted, the mirror driver 111 can change and set a drive condition of the mirror drive signal for driving the deflective mirror 651.

Figure 8:
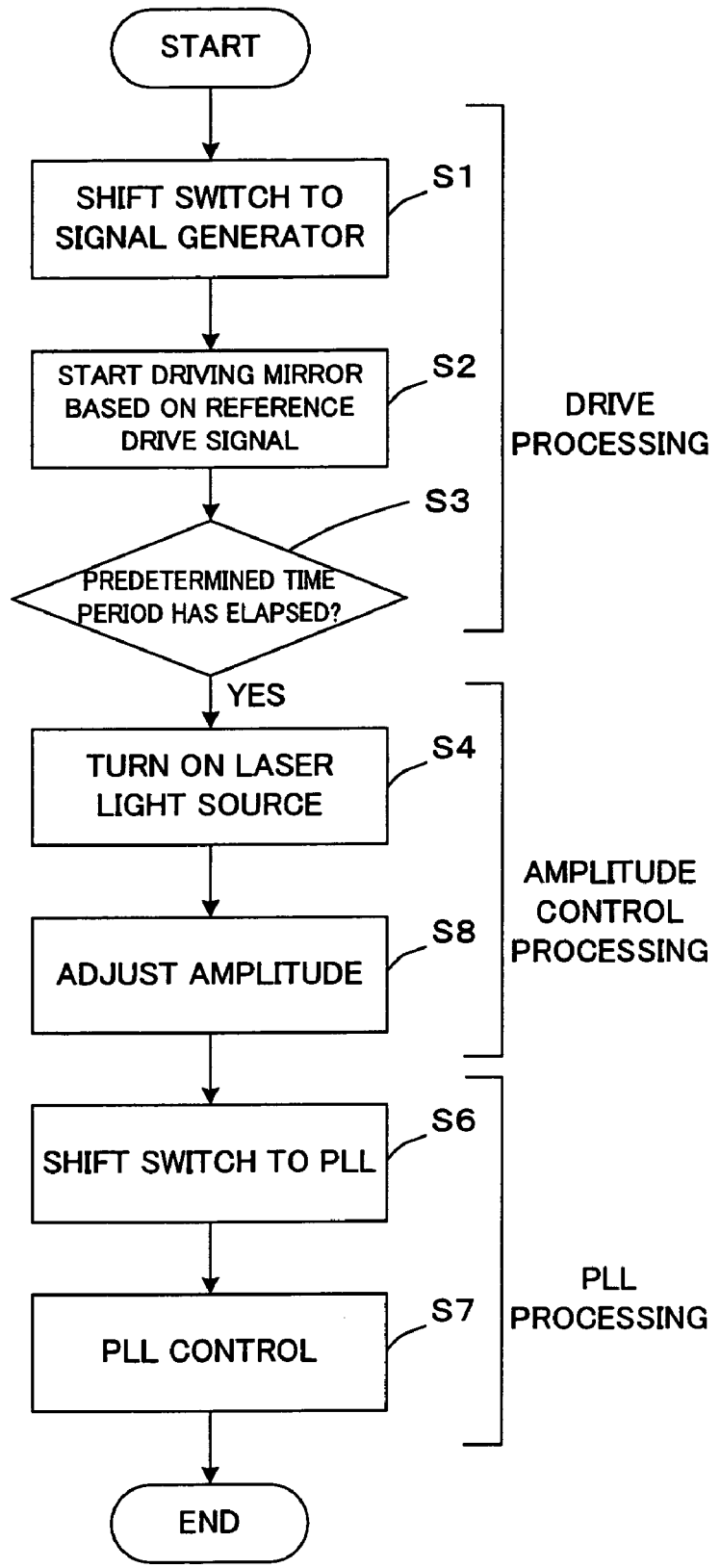
FIG. 8 is a flow chart showing a process performed in the image forming apparatus according to the second embodiment.

FIG. 8 is a flow chart showing a process performed in the image forming apparatus according to the second embodiment. FIGS. 9A and 9B is a group of diagrams schematically showing the amplitude control processing performed on the deflector prior to the color image formation. It is noted here that the description will be made on a case where a color-image forming command is applied as the image forming command. In a case where a monochromatic-image forming command is applied, the following operations are performed only on the black color.

When the color-image forming command is applied, the start-up process for the deflector 65 is performed with respect to the yellow color. Similarly to the first embodiment, the switch 103 is first shifted to the reference drive signal generator 102 of the drive signal controlling section 10Y, so that the reference drive signal outputted from the reference drive signal generator 102 is applied to the mirror driver 111 of the mirror controlling section 11Y as the drive signal Sd (step S1). This brings the operating section 652 into operation at the drive frequency Fd thereby causing the deflective mirror 651 to start oscillating at the drive frequency Fd (Step S2). It is noted here that although the deflective mirror 651 oscillates at the drive frequency Fd, a waveform indicative of an amplitude phase of the deflective mirror 651 may be different from a desired waveform (alternate long and short dash line) as shown in FIG. 9A for example, so that a value θ(y) of the maximum amplitude may be lower than a desired value θr. Conversely, the value θ(y) of the maximum amplitude may be higher than the desired value θr in some cases. If the maximum amplitude θ(y) differs from the desired value θr, the light beam on the photosensitive member 2Y is varied in the scan speed so that the linear latent image formed on the photosensitive member 2Y is elongated or shortened along the main-scan direction X, resulting in the degraded image quality. Hence, after the lapse of a predetermined period of time (Step S3), the amplitude control processing is performed on the yellow deflector 65.

In this amplitude control processing, the main controller MC outputs the image signal Sv to the laser light source 62 so as to turn on the laser light source 62 (Step S4). Alternatively, the engine controller 1 may also apply an image signal suitable for the amplitude control processing to the laser light source 62 so as to carry out the amplitude control processing in a manner described as below. At the point of time that the laser light source 62 is turned on in this manner, the deflector 65 is already in resonant oscillations so as to scan the light beam on the surface of the photosensitive member 2Y. This prevents the light beam from being intensively irradiated on a part of the photosensitive member 2Y. In synchronism with the scanning of the light beam, the horizontal synchronous sensors 60A, 60B output the horizontal synchronous signal Hsync. In the subsequent Step S8, a drive voltage of the mirror drive signal applied from the mirror driver 111 to the deflector 65 is controlled based on the sensor output, thereby to control the amplitude for substantially matching the value θ(y) of the maximum amplitude of the deflector 65 with the desired value θr, as shown in FIG. 9B (amplitude control processing). Thus, the speed of the scan light beam Ly is adjusted to permit the scan light beam Ly to be scanned stably.

When the amplitude control processing is thus completed, the switch 103 is shifted to the PLL processor 101 of the drive signal controlling section 10Y just as in the first embodiment (Step S6). Thus, the drive signal Sd PLL-processed based on the reference signal Sr from the main controller MC and the detection signal Hsync is applied to the mirror driver 111 of the mirror controlling section 11Y via the switch 103 (Step S7). As a result, the mirror driver 111 drives the deflective mirror 651 of the deflector 65 into resonant oscillations at the drive frequency Fd while maintaining the above relationship. This permits the scan light beam Ly to be stably scanned in synchronism with the reference signal from the main controller MC. When the stabilization of the scan speed is completed, the laser light source 62 is turned off and the control signal such as the Ready signal is outputted to the main controller MC thereby to complete the start-up process on the yellow exposure unit 6Y. The same drive processing, amplitude control processing and PLL processing (Steps S1 to S4, S8, S6, S7) as the above are also performed on the other toner colors than yellow.

In the second embodiment, as well, the drive signal controlling section 10 controls the drive signal Sd in a manner to establish the predetermined relationship between the phase of the reference signal Sr and the phase of the horizontal synchronous signal (drive period signal) Hsync, thereby operating the deflector 65 in synchronism with the reference signal Sr. Therefore, the linear latent image may be prevented from deviating with respect to the sub-scan direction Y. Furthermore, the light beam related to any of the toner colors is scanned based on the single reference signal Sr by means of the deflective mirror 651 resonantly oscillating at the predetermined drive frequency Fd. Hence, the latent-image forming positions for the individual toner colors may be prevented from deviating relative to each other with respect to the sub-scan direction Y, so that the color images may be formed favorably.

Further according to this embodiment, even if the maximum amplitude values θ(y), θ(m), θ(c), θ(k) of the deflective mirrors 651 are deviated from the desired value θr at the start-up stage of driving, the individual maximum amplitude values θ(y), θ(m), θ(c), θ(k) may be equalized to the desired value θr by the amplitude control processing. Hence, the speeds of the light beams for the individual toner colors are equalized to ensure that the images are formed in a favorable and stable manner. This embodiment performs the amplitude control processing to match the maximum amplitude value with the desired value θr. However, an alternative arrangement may be made such that a value of the maximum amplitude for any one of the toner colors is defined as a reference amplitude while the amplitude control processing is performed to match the respective maximum amplitude values for the other toner colors with the reference amplitude.

In the case of the color image formation, the drive processing, the amplitude control processing and the PLL processing (Steps S1 to S4, S8, S6, S7) are performed on all the toner colors, as described above. In the case of the monochromatic image formation, however, these processings are performed only on the black color. Hence, the start-up process may be carried out efficiently.

Third Embodiment

In the above first and second embodiments, the horizontal synchronous signal Hsync outputted from the sensors 60A, 60B is defined as the "drive period signal" of the invention. The phase adjustment of the drive signal is performed based on the drive period signal Hsync and the reference signal Sr. That is, measurement is taken on the driven state of the deflector 65 and is used for the phase adjustment of the drive signal. It is noted here that the method of adjusting the phase of the drive signal is not limited to the above control based on measurements. As suggested by third and fourth embodiments described as below, the phase adjustment of the drive signal may be performed based on a predictive state of the deflector 65 being driven. An apparatus of the embodiment is basically arranged the same way as that of the first embodiment. Accordingly, the following description on the embodiment focuses on differences from the above embodiment and like components are represented by the same or equivalent reference characters, respectively, the description of which is dispensed with.

FIG. 10 is a block diagram showing an image forming apparatus according to the third embodiment of the invention. In the third embodiment, when a host computer responding to a request from a user wanting to form an image applies an image forming command to the main controller MC, the main controller MC outputs the image signals Sv of yellow (Y), magenta (M), cyan (C) and black (K) to the respective exposure units 6Y, 6M, 6C, 6K. Furthermore, the main controller MC generates the reference signal Sr common to the four colors and outputs the signal to the drive signal controlling sections 10Y, 10M, 10C, 10K at a time.

Figure 11:
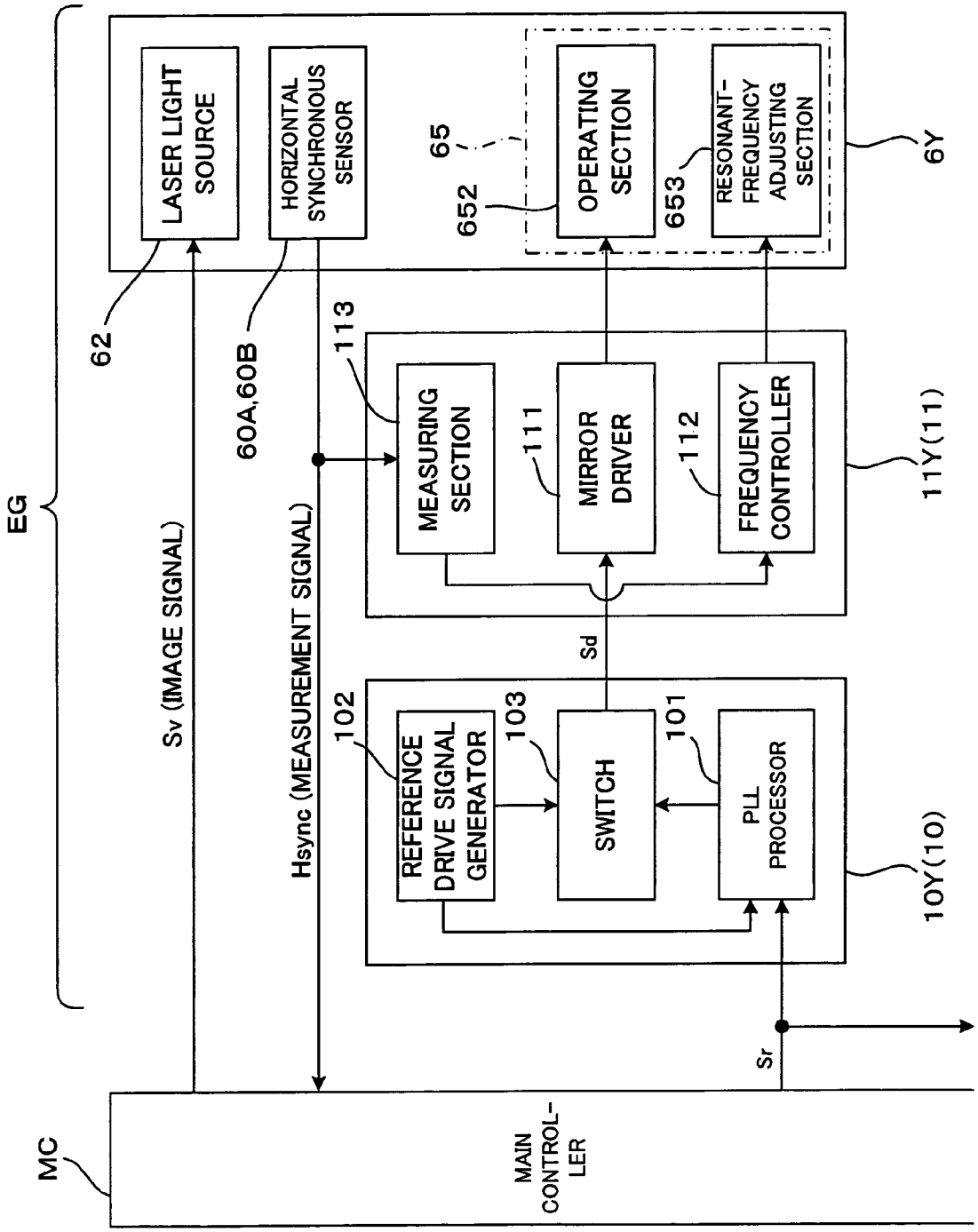
FIG. 11 is a block diagram showing arrangements of an exposure unit and a controlling section according to a third embodiment of the invention.

FIG. 11 is a block diagram showing arrangements of an exposure unit mounted in the image forming apparatus of FIG. 10 and a controlling sections (drive signal controlling section and mirror controlling section) for controlling the exposure unit. The third embodiment principally differs from the first embodiment in the arrangement of the drive signal controlling section 10. Except for this, the third embodiment is basically arranged the same way as the first embodiment. Incidentally, the drive signal controlling sections 10 for the respective color components are arranged the same way. Therefore, the arrangement for the yellow color component is described here while individual parts of the arrangements for the other color components are represented by equivalent reference characters, respectively, and the description thereof is dispensed with.

In the third embodiment, the drive signal controlling section 10Y is not electrically connected with the horizontal synchronous sensors 60A, 60B and hence, performs the phase adjustment of the drive signal Sd without using the horizontal synchronous signal Hsync. Similarly to the first embodiment, the drive signal controlling section 10Y includes the PLL processor 101, the reference drive signal generator 102 and the switch 103. Of these, the reference drive signal generator 102 generates the reference drive signal having the preset drive frequency, and may be comprised of a memory storing the reference drive signal, an oscillator circuit for generating the reference drive signal, and the like. The reference drive signal outputted from the reference drive signal generator 102 is applied to the PLL processor 101 and the switch 103. When the switch 103 is shifted to the reference drive signal generator side, the reference drive signal from the reference drive signal generator 102 is directly applied to the mirror driver 111 as the drive signal Sd, so that the deflective mirror 651 of the deflector 65 is driven into oscillations at the drive frequency.

On the other hand, the PLL processor 101, to which the reference drive signal is inputted, is electrically connected with the main controller MC so as to be capable of receiving the reference signal Sr common to all the toner colors. Based on the reference signal Sr from the main controller MC and the reference drive signal, the PLL processor performs the PLL processing such as to establish the predetermined relationship between the phase of the reference signal Sr and the phase of the reference drive signal, thereby controlling the drive signal. The PLL-processed signal is applied to the switch 103, which applies the signal, as the drive signal Sd, to the mirror driver 111 when the switch 103 is shifted to the PLL processor side. Accordingly, the deflective mirror 651 of the deflector 65 is driven into oscillations with its phase adjusted. A switching timing and a mode of selecting the drive signal are as follows.

When the apparatus of the aforementioned arrangement is applied with the image forming command in a state where the deflector 65 is out of oscillations, the apparatus performs the start-up process before starting the image forming operation. The start-up process makes adjustment for ensuring that the light beam may preferably be scanned by means of the deflector 65 in synchronism with the main controller MC. More specifically, the drive processing, the PLL processing and the resonance control processing are performed as the start-up process.

Figure 12:
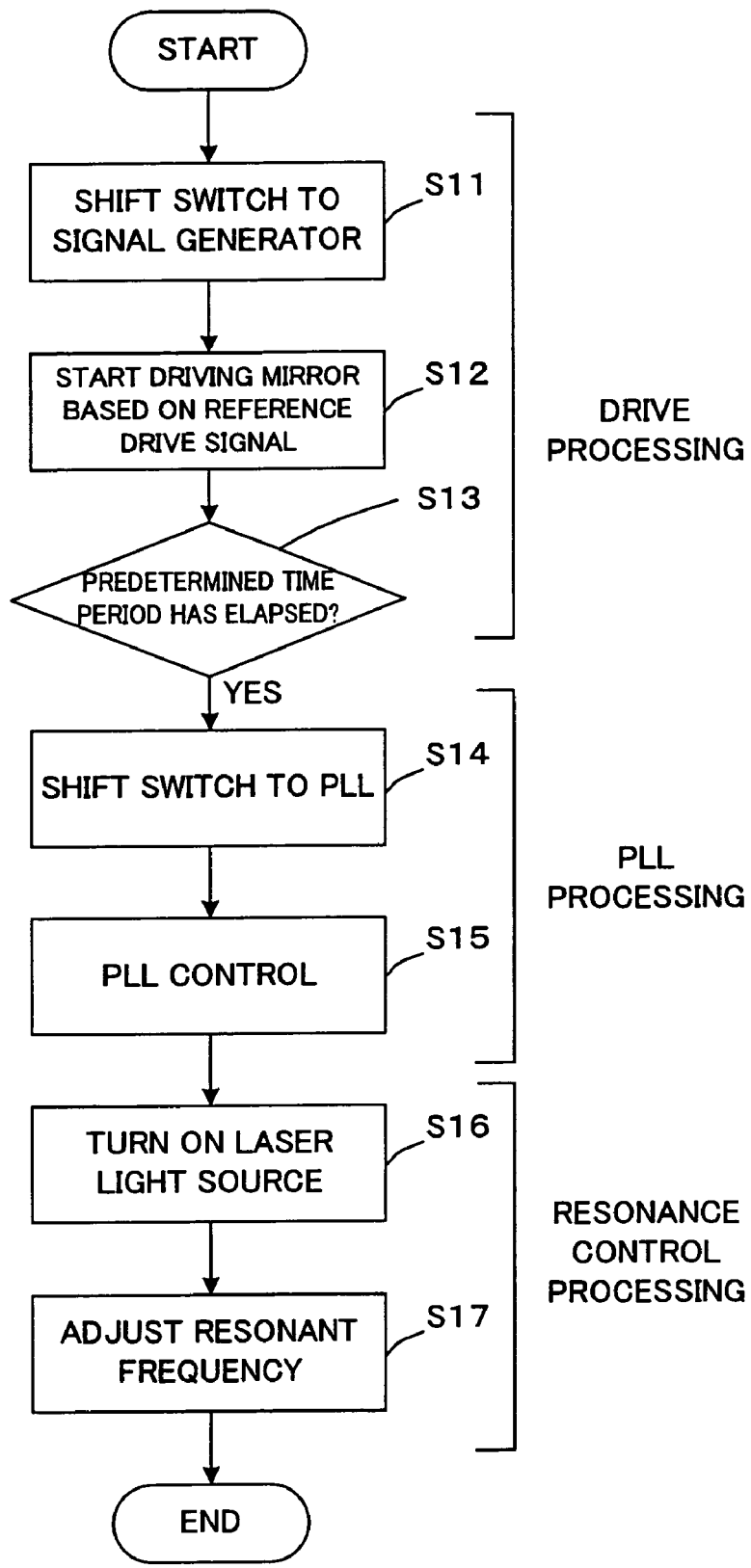
FIG. 12 is a flow chart showing the processings performed in the image forming apparatus according to the third embodiment.

FIG. 12 is a flow chart showing the processings performed in the image forming apparatus of FIG. 10. While the description is made on a case where a color-image forming command is applied as the image forming command, the following operations are performed only on the black color when a monochromatic-image forming command is applied.

When the color-image forming command is applied, the start-up process for the deflector 65 is performed with respect to the yellow color. Firstly in Step S11, the switch 103 is shifted to the reference drive signal generator 102 of the drive signal controlling section 10Y. Hence, the reference drive signal outputted from the reference drive signal generator 102 is applied, as the drive signal Sd, to the mirror driver 111 of the mirror controlling section 11Y. The mirror driver 111, in turn, generates the mirror drive signal based on the drive signal Sd such as to operate the operating section 652 at the drive frequency Fd. This causes the deflective mirror 651 of the deflector 65 to start oscillating at the drive frequency Fd (Step S12). At the start-up stage of driving the deflector, the deflector 65 is so driven based on the reference drive signal generated by the reference drive signal generator 102. Therefore, the deflective mirror 651 of the deflector 65 can be driven into resonant oscillations positively and quickly.

After the lapse of a predetermined period of time (Step S13), the switch 103 is shifted to the PLL processor 101 of the drive signal controlling section 10Y (Step S14). Based on the reference signal Sr from the main controller and the reference drive signal, the PLL processing is performed such as to establish the predetermined relationship between the phase of the reference signal Sr and the phase of the reference drive signal, whereby the drive signal Sd is controlled (Step S15). The drive signal Sd is applied to the mirror driver 111 of the mirror controlling section 11Y via the switch 103. As a result, the mirror driver 111 drives the deflective mirror 651 of the deflector 65 into resonant oscillations at the drive frequency Fd while maintaining the above relationship. This permits the scan light beam Ly to be stably scanned in synchronism with the reference signal from the main controller MC.

As shown in FIG. 6A, for example, the deflective mirror 651 oscillates at the frequency Fd. In a case where the resonant frequency Fry of the deflector 65 is deviated from the drive frequency Fd, a maximum amplitude value θ(y) of the deflective mirror 651 is significantly decreased from the maximum amplitude during the resonant oscillations. Hence, after the completion of the above PLL processing, the embodiment carries out the resonance control processing on the yellow deflector 65.

In this resonance control processing, the main controller MC outputs the image signal Sv to the laser light source 62 so as to turn on the laser light source 62 (Step S16). Alternatively, the engine controller 1 may also apply an image signal suitable for the resonance control processing to the laser light source 62 so as to carry out the resonance control processing in a manner described as below. At the point of time that the laser light source 62 is turned on in this manner, the deflector 65 is already in resonant oscillations so as to scan the light beam on the surface of the photosensitive member 2Y. This prevents the light beam from being intensively irradiated on a part of the photosensitive member 2Y In synchronism with the scanning of the light beam, the horizontal synchronous sensors 60A, 60B output the horizontal synchronous signal Hsync. In the subsequent Step S17, the frequency controlling section 112 controls power supply to the electrical resistance element based on the sensor outputs so as to vary the temperature of the torsion spring of the deflector 65, whereby the resonant characteristic of the deflector 65 is shifted from the broken line (pre-adjustment) to the drive frequency side, as shown in FIG. 6B. Thus, the resonant frequency Fry of the deflector 65 is substantially matched with the drive frequency Fd, so that the amplitude θ(y) is at the maximum amplitude.

When the resonance control processing is thus completed, the laser light source 62 is turned off and the control signal such as the Ready signal is outputted to the main controller MC thereby to complete the start-up process on the yellow exposure unit 6Y. The same drive processing, resonance control processing and PLL processing (Steps S11 to S17) as the above are also performed on the other toner colors than yellow.

According to this embodiment as described above, the deflector 65 is operated in synchronism with the reference signal Sr by controlling the drive signal Sd in a manner to establish the predetermined relationship between the phase of the reference signal Sr and the phase of the reference drive signal. Therefore, the latent-image forming position with respect to the sub-scan direction Y is adjusted by way of the phase adjustment between the reference signal Sr and the reference drive signal, so that the linear latent image is prevented from deviating with respect to the sub-scan direction Y. As a result, the images may be formed in high quality.

Also in this embodiment, the color image is formed by a so-called tandem system. If the latent-image forming positions in the individual exposure units 6 (6Y, 6M, 6C, 6K) are deviated relative to each other, there will occur the color misregistration which degrades the image quality. However, the main controller MC inputs the reference signal Sr to the drive signal controlling sections 10 (10Y, 10M, 10C, 10K) for the respective colors so as to carry out the PLL processings simultaneously. Thus, the light beam related to any of the toner colors is scanned based on the single reference signal Sr by means of the deflective mirror 651 resonantly oscillating at the predetermined drive frequency Fd. Hence, the latent-image forming positions for the individual toner colors may be prevented from deviating relative to each other with respect to the sub-scan direction Y, so that the color images may be formed favorably Furthermore, the frequency controlling section 112 controls the resonant-frequency adjusting section 653 thereby to make adjustment for matching the resonant frequency of the deflector 65 substantially with the drive frequency Fd (resonance control processing). Therefore, even if the resonant frequency of the deflector 65 is deviated from the drive frequency Fd at the start-up stage of driving, the resonance control processing permits the deflector 65 to oscillate resonantly at the predetermined frequency Fd and in the maximum amplitude. It is thus ensured that the image formation is performed in a favorable and stable manner.

In the case of the color image formation, the drive processing, the PLL processing and the resonance control processing (Steps S11 to S17) are performed on the respective toner colors, as described above. In the case of the monochromatic image formation, however, these processings are performed only on the black color. Hence, the start-up process may be carried out efficiently.

Fourth Embodiment

Figure 13:
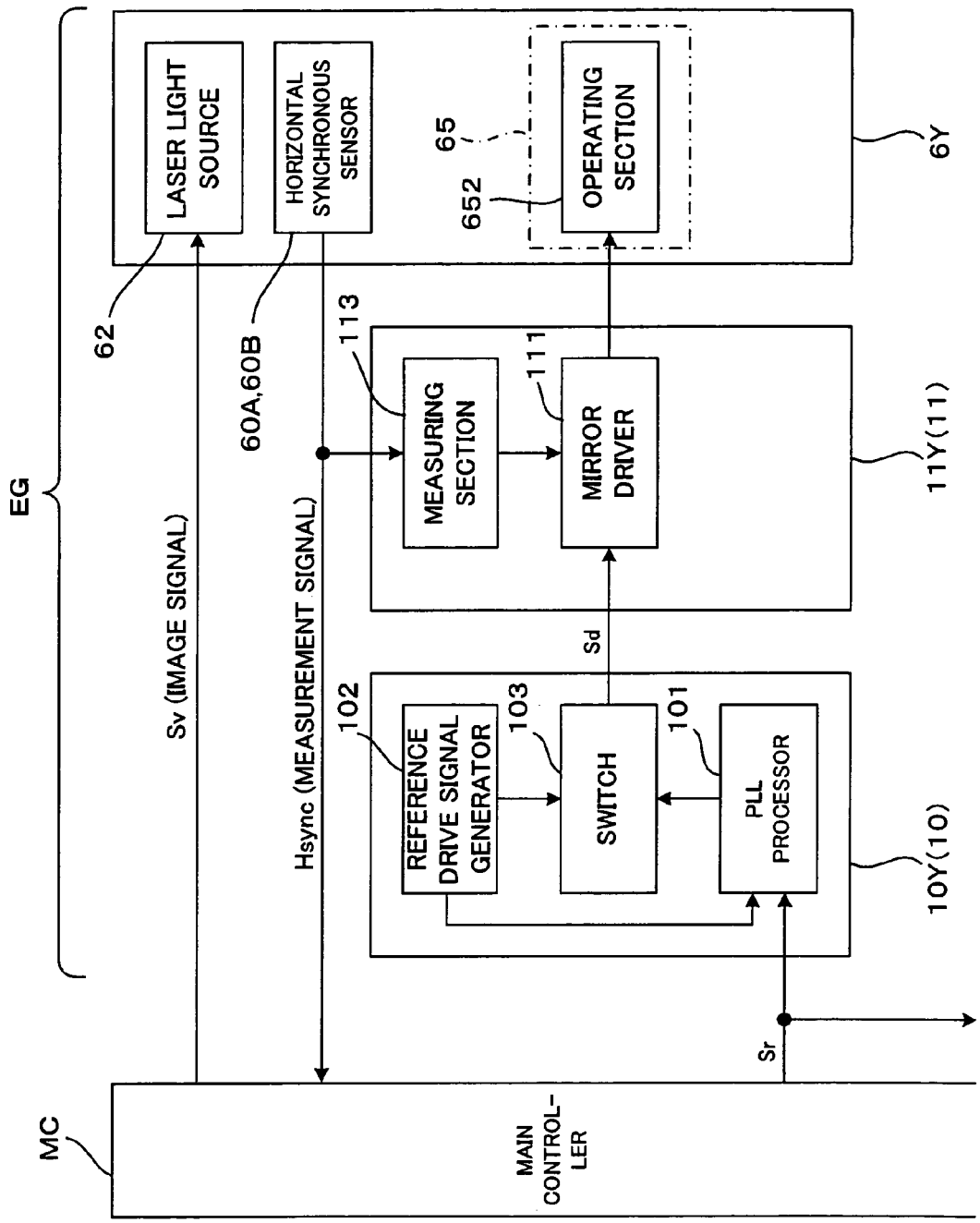
FIG. 13 is a block diagram showing arrangements of an exposure unit and a controlling section according to a fourth embodiment of the invention.

FIG. 13 is a block diagram showing arrangements of an exposure unit according to a fourth embodiment of the invention and a controlling section (drive signal controlling section and mirror controlling section) for controlling the exposure unit. The fourth embodiment principally differs from the third embodiment in that the resonance control processing is not performed, whereas the amplitude control processing is performed based on the horizontal synchronous signal Hsync. Except for this, the fourth embodiment is basically arranged the same way as the third embodiment. The following description is made on the arrangement and operations of the fourth embodiment, focusing on the difference from the third embodiment.

According to the fourth embodiment, the scan-beam detection signal Hsync provided by the horizontal synchronous sensors 60A, 60B is transmitted to the measuring section 113 of the mirror controlling section 11 (11Y, 11M, 11C, 11K). The measuring section 103 calculates a drive information such as the scan time during which the light beam is scanned on the effective scan region, the drive period or the like. The drive information calculated by the measuring section 103 is transmitted to the mirror driver 111. Based on the drive information thus transmitted, the mirror driver 111 can change and set the drive condition of the mirror drive signal for driving the deflective mirror 651.

Figure 14:
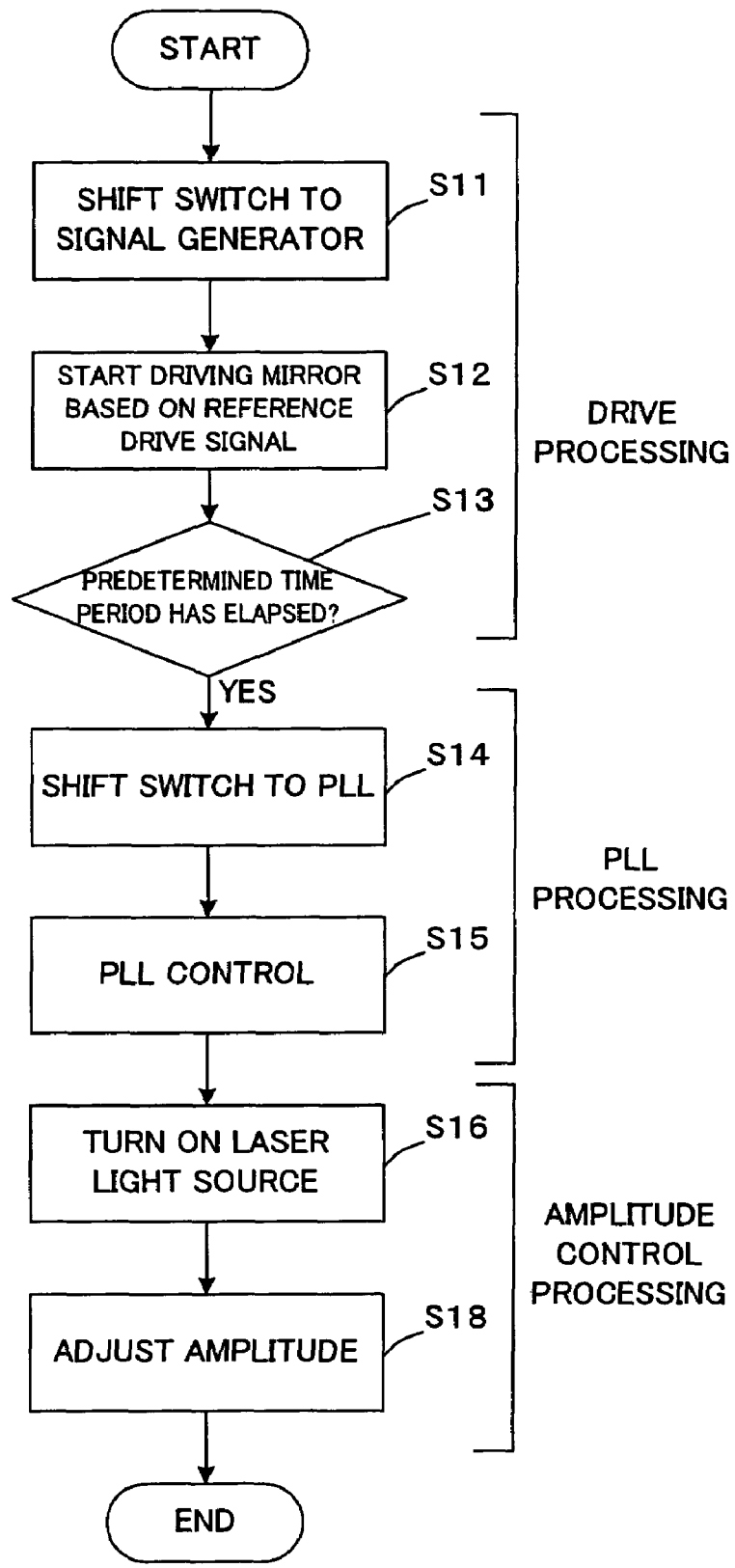
FIG. 14 is a flow chart showing the processings performed in the image forming apparatus according to the fourth embodiment.

FIG. 14 is a flow chart showing processings performed in the image forming apparatus according to the fourth embodiment. While the description is made on a case where the color-image forming command is applied as the image forming command, the following operations are performed only on the black color when the monochromatic-image forming command is applied.

When the color-image forming command is applied, the start-up process for the deflector 65 is performed with respect to the yellow color. Firstly just as in the third embodiment, the switch 103 is shifted to the reference drive signal generator 102 of the drive signal controlling section 10Y, so that the reference drive signal outputted from the reference drive signal generator 102 is applied, as the drive signal Sd, to the mirror driver 111 of the mirror controlling section 11Y (Step S11). This brings the operating section 652 into operation at the drive frequency Fd thereby causing the deflective mirror 651 to start oscillating at the drive frequency Fd (Step S12).

After the lapse of a predetermined period of time (Step S13), the switch 103 is shifted to the PLL processor 101 of the drive signal controlling section 10Y (Step S14). Based on the reference signal Sr from the main controller and the reference drive signal, the PLL processing is performed such as to establish the predetermined relationship between the phase of the reference signal and the phase of the reference drive signal, whereby the drive signal Sd is controlled (Step S15). The drive signal Sd is applied to the mirror driver 111 of the mirror controlling section 11Y via the switch 103. As a result, the mirror driver 111 drives the deflective mirror 651 of the deflector 65 into resonant oscillations at the drive frequency Fd while maintaining the above relationship. This permits the scan light beam Ly to be stably scanned in synchronism with the reference signal from the main controller MC.

It is noted here that although the deflective mirror 651 oscillates at the drive frequency Fd, the waveform indicative of the amplitude phase of the deflective mirror 651 may be different from the desired waveform (alternate long and short dash line) as shown in FIG. 9A for example. Hence, the value of the maximum amplitude θ(y) may be lower than the desired value θr. Conversely, the maximum amplitude value θ(y) may be higher than the desired value θr in some cases. If the maximum amplitude θ(y) differs from the desired value θr, the light beam on the photosensitive member 2Y is varied in the scan speed so that the linear latent image formed on the photosensitive member 2Y is elongated or shortened along the main-scan direction X, resulting in the degraded image quality. Hence, after the completion of the above PLL processing, the embodiment carries out the amplitude control processing on the yellow deflector 65.

In this amplitude control processing, the main controller MC outputs the image signal Sv to the laser light source 62 so as to turn on the laser light source 62 (Step S16). Alternatively, the engine controller 1 may also apply an image signal suitable for the amplitude control processing to the laser light source 62 so as to carry out the amplitude control processing in a manner described as below. At the point of time that the laser light source 62 is turned on in this manner, the deflector 65 is already in resonant oscillations so as to scan the light beam on the surface of the photosensitive member 2Y. This prevents the light beam from being intensively irradiated on a part of the photosensitive member 2Y In synchronism with the scanning of the light beam, the horizontal synchronous sensors 60A, 60B output the horizontal synchronous signal Hsync. In the subsequent Step S18, the drive voltage of the mirror drive signal applied from the mirror driver 111 to the deflector 65 is controlled based on the sensor outputs, thereby to control the amplitude for substantially matching the value θ(y) of the maximum amplitude of the deflector 65 with the desired value θr, as shown in FIG. 9B (amplitude control processing). Thus, the speed of the scan light beam Ly is adjusted to permit the scan light beam Ly to be scanned stably.

When the amplitude control processing is completed, the laser light source 62 is turned off while the control signal such as the Ready signal is outputted to the main controller MC thereby to complete the start-up process for the yellow exposure unit 6Y, just as in the third embodiment. The same drive processing, PLL processing and resonance control processing (Steps S11 to S16, S18) as the above are also performed on the other toner colors than yellow.

According to the fourth embodiment as well, the deflector 65 is operated in synchronism with the reference signal Sr by controlling the drive signal Sd in a manner to establish the predetermined relationship between the phase of the reference signal Sr and the phase of the reference drive signal. Therefore, the linear latent image may be prevented from deviating with respect to the sub-scan direction Y. Furthermore, the light beam related to any of the toner colors is scanned based on the single reference signal Sr by means of the deflective mirror 651 resonantly oscillating at the predetermined drive frequency Fd. Hence, the latent-image forming positions for the individual toner colors may be prevented from deviating relative to each other with respect to the sub-scan direction Y, so that the color images may be formed favorably.

Further according to this embodiment, even if the maximum amplitude values θ(y), θ(m), θ(c), θ(k) of the deflective mirrors 651 are deviated from the desired value θr at the start-up stage of driving, the individual maximum amplitudes θ(y), θ(m), θ(c), θ(k) may be equalized to the desired value θr by the amplitude control processing. Hence, the speeds of the light beams for the individual toner colors are equalized to ensure that the images are formed in a favorable and stable manner. This embodiment performs the amplitude control processing to match the maximum amplitude with the desired value θr. However, an alternative arrangement may be made such that a maximum amplitude for any one of the toner colors is defined as a reference amplitude while the amplitude control processing is performed to match the respective maximum amplitudes for the other toner colors with the reference amplitude.

In the case of the color image formation, the drive processing, the PLL processing and the resonance control processing (Steps S11 to S16, S18) are performed on the respective toner colors, as described above. In the case of the monochromatic image formation, however, these processings are performed only on the black color. Hence, the start-up process may be carried out efficiently.

<Other Features>

It is to be noted that the invention is not limited to the foregoing embodiments and various modifications other than the above may be made thereto so long as such modifications do not depart from the scope of the invention. In the foregoing embodiments, for example, the horizontal synchronous signal Hsync from the horizontal synchronous sensors 60A, 60B is used as the "drive period signal", based on which the resonance control processing and the amplitude control processing are performed. That is, the horizontal synchronous sensors 60A 60B are used as the "detector unit" of the invention. However, the information usable for the adjustment of the resonant frequency or the drive voltage is not limited to the horizontal synchronous signal Hsync, but any information related to the drive period of the deflector 65 is usable. For instance, a displacement detection sensor such as disclosed in Japanese Unexamined Patent Publication No.7-218857 may be provided at the deflector 65 for detecting the amount of displacement of the deflective mirror 651. On the basis of the detected value the PLL processing, the resonance control processing or the amplitude control processing may be performed. In this case, the displacement detection sensor is equivalent to the "detector unit" of the invention.

While the foregoing embodiments employ the resonant-frequency adjusting section 653 which utilizes the variations of the spring constant associated with the temperature variations thereof, the arrangement of the resonant-frequency adjusting section 653 is not limited to this. The resonant frequency may be adjusted by the conventionally known methods.

Although the foregoing embodiments carry out the resonance control processing and the amplitude control processing, these control processings are not essential. The control processing may be carried out in any combinations. For instance, the resonance control processing may be omitted in the first and third embodiments. Otherwise, the amplitude control processing may be omitted in the second and fourth embodiments.

In addition, the foregoing embodiments apply the invention to the color image forming apparatuses of the tandem system, but the scope of the invention is not limited to this. The invention is also applicable to color image forming apparatuses of a so-called 4-cycle system, and monochromatic image forming apparatuses for forming monochromatic images.

In the foregoing embodiments, the deflector 65 formed using a micromachining technique is employed as the oscillation mirror. However, the invention is applicable to all kinds of tandem-type image forming apparatuses which use the oscillation mirror in resonant oscillations for deflecting the light beam thereby scanning the light beam on the latent image carrier.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. An image forming apparatus comprising:
a controller which outputs image signals of plural colors corresponding to a received image forming command; and
an engine which is provided with an image forming unit in correspondence to each of the plural colors, each of the image forming units operative to form a latent image on a latent image carrier by scanning a light beam, modulated according to the image signal of the corresponding color applied from the controller, in a main-scan direction by means of an oscillation mirror resonantly oscillating according to a drive signal, and to form a toner image by developing the latent image with a toner of the corresponding color, and which forms a color image by superimposing the toner images of the plural colors on a transfer medium,
wherein the engine comprises in correspondence to each of the plural colors: a detector unit which detects a drive period of the oscillation mirror provided at the image forming unit for the corresponding color and outputs a drive period signal related to the drive period; a drive signal controlling section which outputs a drive signal for controlling the drive of the oscillation mirror; and a mirror controlling section which drives the oscillation minor into operation based on the drive signal outputted from the drive signal controlling section,
wherein the controller generates a reference signal common to the plural colors and outputs the reference signal to the drive signal controlling sections for the plural colors at a time,
wherein each of the plural drive signal controlling sections receives the drive period signal outputted from the corresponding detector unit and the reference signal from the controller, so as to control the drive signal in a manner to establish a predetermined relationship between a phase of the reference signal and a phase of the drive period signal, and
wherein the resonant frequency of the oscillation mirror is matched with the frequency of the drive signal such that each oscillation mirror is driven at a common resonant frequency, before controlling the drive signal in a manner to establish the predetermined relationship between the phase of the reference signal and the phase of the drive period signal.

2. An image forming apparatus according to claim 1, wherein the controller performs different control processing depending on whether the image forming command is a color image forming command or a monochromatic image forming command.

3. An image forming apparatus according to claim 2, wherein
when the image forming command is a color image forming command, each of the plural drive signal controlling sections control the drive signal in a same manner; and
when the image forming command is a monochromatic image forming command, only one drive signal controlling section corresponding to one color controls a drive signal.

4. An image forming apparatus comprising:
a controller which outputs image signals of plural colors corresponding to a received image forming command; and
an engine which is provided with an image forming unit in correspondence to each of the plural colors, the image forming unit operative to form a latent image on a latent image carrier by scanning a light beam, modulated according to the image signal of the corresponding color applied from the controller, in a main-scan direction by means of an oscillation mirror resonantly oscillating according to a drive signal, and to form a toner image by developing the latent image with a toner of the corresponding color, and which forms a color image by superimposing the toner images of the plural colors on a transfer medium,
wherein the engine comprises in correspondence to each of the plural colors: a drive signal controlling section which outputs a drive signal for controlling the drive of the oscillation mirror provided at the image forming unit for the corresponding color; and a mirror controlling section which drives the oscillation mirror into operation based on the drive signal outputted from the drive signal controlling section,
wherein the controller generates a reference signal common to the plural colors and outputs the reference signal to the plural drive signal controlling sections at a time,
wherein each of the plural drive signal controlling sections includes a reference drive signal generator which generates a reference drive signal having a predetermined drive frequency, and controls the drive signal based on the reference drive signal and the reference signal in a manner to establish a predetermined relationship between a phase of the reference signal and a phase of the reference drive signal, and
wherein the resonant frequency of the oscillation mirror is matched with the drive frequency such that each oscillation mirror is driven at a common resonant frequency, before controlling the drive signal in a manner to establish the predetermined relationship between the phase of the reference signal and the phase of the reference drive signal.

5. An image forming apparatus according to claim 4, wherein the controller performs different control processing depending on whether the image forming command is a color image forming command or a monochromatic image forming command.

6. An image forming apparatus according to claim 5, wherein
when the image forming command is a color image forming command, each of the plural drive signal controlling sections control the drive signal in a same manner; and
when the image forming command is a monochromatic image forming command, only one drive signal controlling section corresponding to one color controls a drive signal.

7. An image forming method for forming a color image by operating an image forming apparatus including: a controller which outputs image signals of plural colors corresponding to a received image forming command; and an engine which is provided with an image forming unit in correspondence to each of the plural colors, the image forming unit operative to form a latent image on a latent image carrier by scanning a light beam, modulated according to the image signal of the corresponding color applied from the controller, in a main-scan direction by means of an oscillation mirror resonantly oscillating according to a drive signal outputted from a drive signal controlling section, and to form a toner image by developing the latent image with a toner of the corresponding color, and which forms the color image by superimposing the toner images of the plural colors on a transfer medium, the method comprising:
a step of outputting a reference signal common to the plural colors from the controller to the plural drive signal controlling sections at a time;
a step of starting the drive of each of the plural oscillation mirrors by outputting, as the drive signal, a reference drive signal having a predetermined drive frequency from a reference drive signal generator corresponding to the oscillation mirror;
a step of detecting a drive period of each of the plural oscillation mirrors which outputs a drive period signal related to the drive period of the corresponding oscillation mirror;
a step of matching the resonant frequency of the oscillation mirror with the drive frequency such that each oscillation mirror is driven at a common resonant frequency; and
a step of synchronizing the resonant operation of each of the plural oscillation mirrors with individual parts of the apparatus, after the step of matching the resonant frequency, by controlling the drive signal which drives the corresponding oscillation mirror in a manner to establish a predetermined relationship between a phase of the drive period signal corresponding to the oscillation mirror and a phase of the reference signal.

8. An image forming method according to claim 7, wherein different control processing is performed depending on whether the image forming command is a color image forming command or a monochromatic image forming command.

9. An image forming method according to claim 8, wherein
when the image forming command is a color image forming command, each of the plural drive signal controlling sections control the drive signal in a same manner; and
when the image forming command is a monochromatic image forming command, only one drive signal controlling section corresponding to one color controls a drive signal.

10. An image forming method for forming a color image by operating an image forming apparatus including: a controller which outputs image signals of plural colors corresponding to a received image forming command; and an engine which is provided with an image forming unit in correspondence to each of the plural colors, the image forming unit operative to form a latent image on a latent image carrier by scanning a light beam, modulated according to the image signal of the corresponding color applied from the controller, in a main-scan direction by means of an oscillation minor resonantly oscillating according to a drive signal outputted from a drive signal controlling section, and to form a toner image by developing the latent image with a toner of the corresponding color, and which forms the color image by superimposing the toner images of the plural colors on a transfer medium, the method comprising:

a step of outputting a reference signal common to the plural colors from the controller to the plural drive signal controlling sections at a time;

a step of starting the drive of each of the plural oscillation mirrors by outputting, as the drive signal, a reference drive signal having a predetermined drive frequency outputted from a reference drive signal generator corresponding to the oscillation mirror;

a step of matching the resonant frequency of the oscillation mirror with the drive frequency such that each oscillation mirror is driven at a common resonant frequency; and a step of synchronizing the resonant operation of each of the plural oscillation mirrors with individual parts of the apparatus after the start of the drive of the oscillation mirror by controlling the drive signal and the step of matching the resonant frequency in a manner to establish a predetermined relationship between a phase of the reference signal and a phase of the reference drive signal.

11. An image forming method according to claim 10, wherein different control processing is performed depending on whether the image forming command is a color image forming command or a monochromatic image forming command.

12. An image forming method according to claim 11, wherein when the image forming command is a color image forming command, each of the plural drive signal controlling sections control the drive signal in a same manner; and when the image forming command is a monochromatic image forming command, only one drive signal controlling section corresponding to one color controls a drive signal.

* * * * *